US012626729B2

(12) United States Patent
Hyde et al.

(10) Patent No.: US 12,626,729 B2
(45) Date of Patent: May 12, 2026

(54) SYSTEM AND METHOD FOR VIDEO/AUDIO COMPREHENSION AND AUTOMATED CLIPPING

(71) Applicant: Disney Enterprises, Inc., Burbank, CA (US)

(72) Inventors: Andrew Hyde, Burbank, CA (US);
Geoffrey Booth, Burbank, CA (US);
Ognjen Boras, Burbank, CA (US);
Jonathan Flanders, Burbank, CA (US);
Danny Donnell, Burbank, CA (US)

(73) Assignee: DISNEY ENTERPRISES, INC.,
Burbank, CA (US)

( * ) Notice: Subject to any disclaimer, the term of this patent is extended or adjusted under 35 U.S.C. 154(b) by 159 days.

(21) Appl. No.: 18/326,720

(22) Filed: May 31, 2023

(65) Prior Publication Data

US 2024/0404563 A1     Dec. 5, 2024

(51) Int. Cl.
*G11B 27/34*          (2006.01)
*G06F 40/205*       (2020.01)
*G06F 40/295*       (2020.01)
*H04N 21/8549*     (2011.01)

(52) U.S. Cl.
CPC ............ *G11B 27/34* (2013.01); *G06F 40/205*
(2020.01); *G06F 40/295* (2020.01); *H04N*
*21/8549* (2013.01)

(58) Field of Classification Search
CPC ..... G11B 27/34; G06F 40/205; G06F 40/295;
H04N 21/8549
USPC ........................................................ 386/241
See application file for complete search history.

(56) References Cited

U.S. PATENT DOCUMENTS

| | | | |
|---|---|---|---|
| 10,289,963 B2 | 5/2019 | Chiticariu | |
| 11,055,334 B2 * | 7/2021 | Hu ........................... | G06F 16/35 |
| 11,354,894 B2 | 6/2022 | Farre Guiu et al. | |
| 11,501,075 B1 * | 11/2022 | Pandey ................. | G06V 30/416 |
| 2005/0267871 A1 * | 12/2005 | Marchisio ........... | G06F 16/3338 |
| 2015/0088888 A1 | 3/2015 | Brennan | |

(Continued)

OTHER PUBLICATIONS

English Translation of WIPO Publication WO/2023/246395, PCT CN2023/095265 filed May 19, 2023 (Year: 2023).*

(Continued)

*Primary Examiner* — Loi H Tran
(74) *Attorney, Agent, or Firm* — McCormick, Paulding & Huber PLLC

(57)          ABSTRACT

Systems and Methods for Video/Audio Comprehension and Automated Clipping includes providing at least one media clip (MC) within an event for display or listening on a user device including receiving audio or video media data indicative of the event, transcribing the media data into time-stamped text, identifying entities within the text, creating text segments having a begin timestamp and end timestamp and having a minimum number of entity mentions in the text segments, clipping from the media data the at least one media clip having a begin timestamp and end timestamp corresponding to the begin timestamp and end timestamp of a corresponding one of the text segments, and providing the at least one media clip to the user device for viewing or listening by a user. Feedback may also be provided to adjust the logic that identifies MCs. MC Alerts may also be sent to users autonomously or based on user-set parameters.

35 Claims, 32 Drawing Sheets

(56) References Cited

U.S. PATENT DOCUMENTS

| | | | |
|---|---|---|---|
| 2015/0242387 A1 | 8/2015 | Rachevsky | |
| 2016/0042473 A1* | 2/2016 | Danielli | G06F 3/04847 |
| | | | 705/319 |
| 2016/0365121 A1 | 12/2016 | DeCaprio | |
| 2018/0191852 A1* | 7/2018 | Brunn | H04L 51/52 |
| 2019/0065911 A1 | 2/2019 | Lee | |
| 2019/0294999 A1* | 9/2019 | Guttmann | G06F 18/217 |
| 2020/0066271 A1* | 2/2020 | Li | G10L 15/02 |
| 2020/0410053 A1* | 12/2020 | Zhang | G06N 3/02 |
| 2024/0380945 A1* | 11/2024 | Schweinsberg | G11B 27/031 |

OTHER PUBLICATIONS

English Translation of Chinese Publication CN116127003 May 16, 2023 (Year: 2023).*

* cited by examiner

Fig. 3

Segmenting & Clipping Logic

300

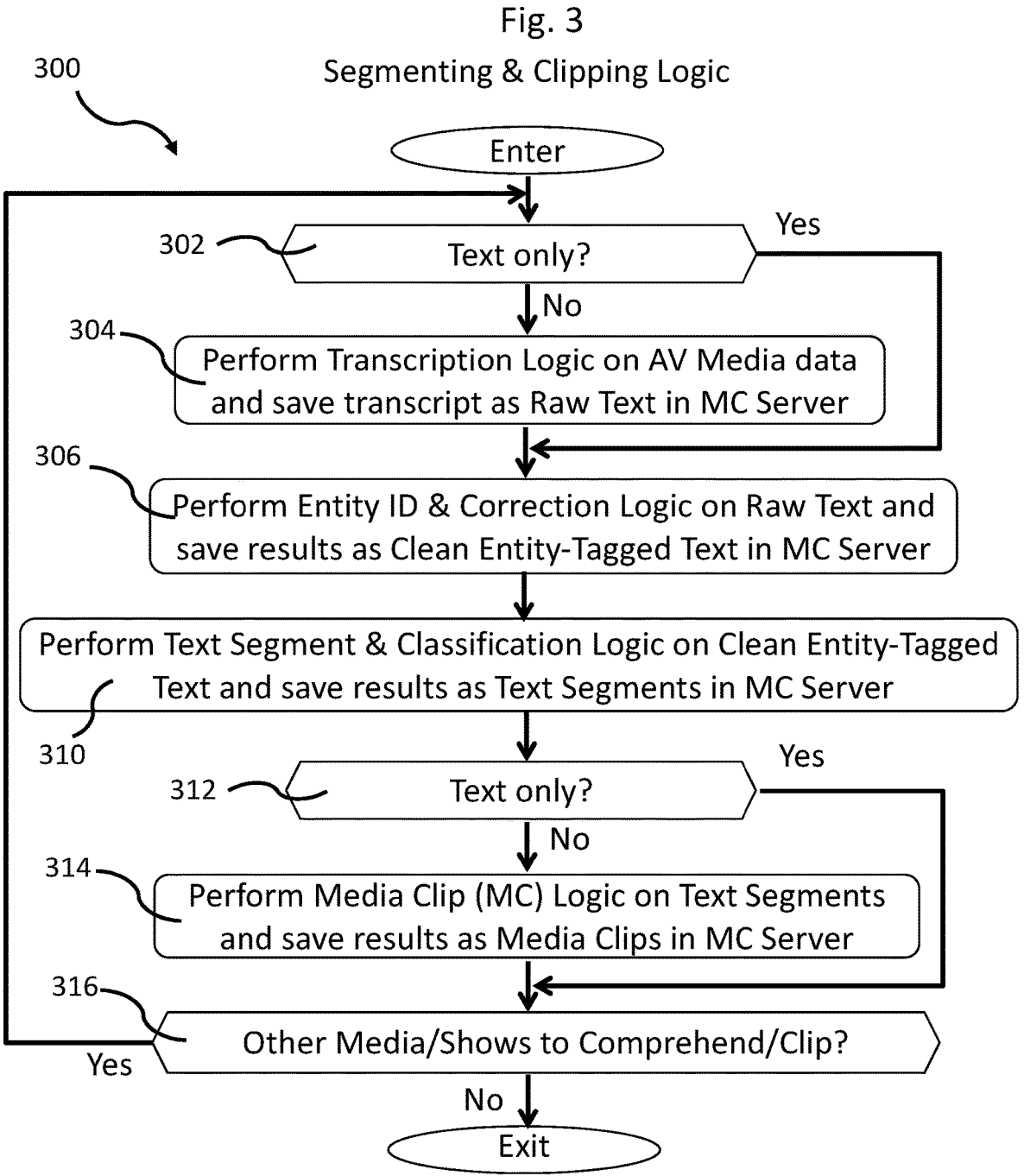

Enter

302 Text only? — Yes

No

304 Perform Transcription Logic on AV Media data and save transcript as Raw Text in MC Server 306 Perform Entity ID & Correction Logic on Raw Text and save results as Clean Entity-Tagged Text in MC Server Perform Text Segment & Classification Logic on Clean Entity-Tagged Text and save results as Text Segments in MC Server

310

312 Text only? — Yes

No

314 Perform Media Clip (MC) Logic on Text Segments and save results as Media Clips in MC Server 316 Other Media/Shows to Comprehend/Clip?

Yes

No

Exit

Figure 4:
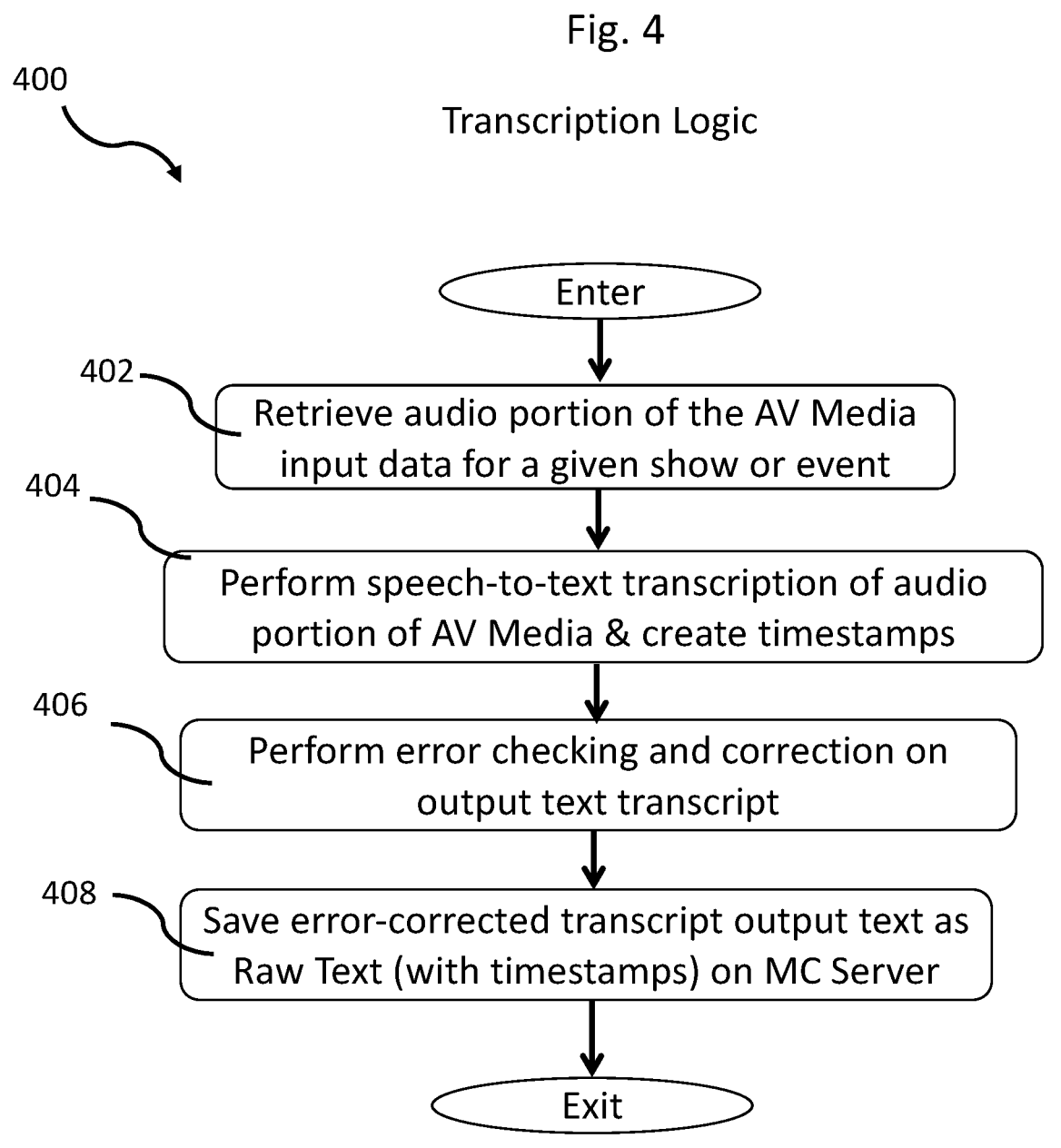

Transcription Logic

Enter

402
Retrieve audio portion of the AV Media input data for a given show or event

404
Perform speech-to-text transcription of audio portion of AV Media & create timestamps 406
Perform error checking and correction on output text transcript 408
Save error-corrected transcript output text as Raw Text (with timestamps) on MC Server Exit Entity ID & Correction Logic Entity ID & Correction

Fig. 5C

Entities Data Table

580

| Sport | League | Conference | Team | Player | Others |
|---|---|---|---|---|---|
| Football | NFL | AFC | Buffalo | Player List - Buff. | Trainers, Coaches, etc. List |
| | | | Miami | Player List - Miami | Trainers, Coaches, etc. List |
| | | | NE | Player List - NE | Trainers, Coaches, etc. List |
| | | | Others * * * | Others * * * | Others * * * |
| | | NFC | Philly | Player List - Pilly | Trainers, Coaches, etc. List |
| | | | Dallas | Player List - Dallas | Trainers, Coaches, etc. List |
| | | | NYG | Player List - NYG | Trainers, Coaches, etc. List |
| | | | Others * * * | Others * * * | Others * * * |
| Basketball | NBA | East | MIL | Player List - MIL | Trainers, Coaches, etc. List |
| | | | BOS | Player List - BOS | Trainers, Coaches, etc. List |
| | | | PHI | Player List - PHI | Trainers, Coaches, etc. List |
| | | | Others * * * | Others * * * | Others * * * |
| | | West | DEN | Player List - DEN | Trainers, Coaches, etc. List |
| | | | MEM | Player List - MEM | Trainers, Coaches, etc. List |
| | | | SAC | Player List - SAC | Trainers, Coaches, etc. List |
| | | | Others * * * | Others * * * | Others * * * |
| Baseball | MLB | AL | TB | Player List - TB | Trainers, Coaches, etc. List |
| | | | TOR | Player List - TOR | Trainers, Coaches, etc. List |
| | | | NYY | Player List - NYY | Trainers, Coaches, etc. List |
| | | | Others * * * | Others * * * | Others * * * |
| | | NL | ATL | Player List - ATL | Trainers, Coaches, etc. List |
| | | | NYM | Player List - NYM | Trainers, Coaches, etc. List |
| | | | MIA | Player List - MIA | Trainers, Coaches, etc. List |
| | | | Others * * * | Others * * * | Others * * * |
| Other Sports * * * | Other Leagues * * * | Other Conf. * * * | Other Teams * * * | Other Players * * * | Others * * * |

Segment & Clipping Rules/Data Table

| Parameter | Value |
|---|---|
| Phonetic & Co-Reference Rules/Data | |
| Min. Possible Phonetic Partial Match | 3 letters |
| Co-reference Offset Maxmimum | 5 sentences |
| | |
| Segment & Clipping Rules/Data | |
| Max. Entity Gap Length | 60 sec. |
| Min. Mention Count | 2 |
| Min. Cluster Length | 90 sec. |
| Max. Segment Length | 5 min. |
| Exclude Clusters or Segments > Max Seg Length | Yes |
| Cluster Adjustment Time (pad) | +/- 20 sec. |

Fig. 6A

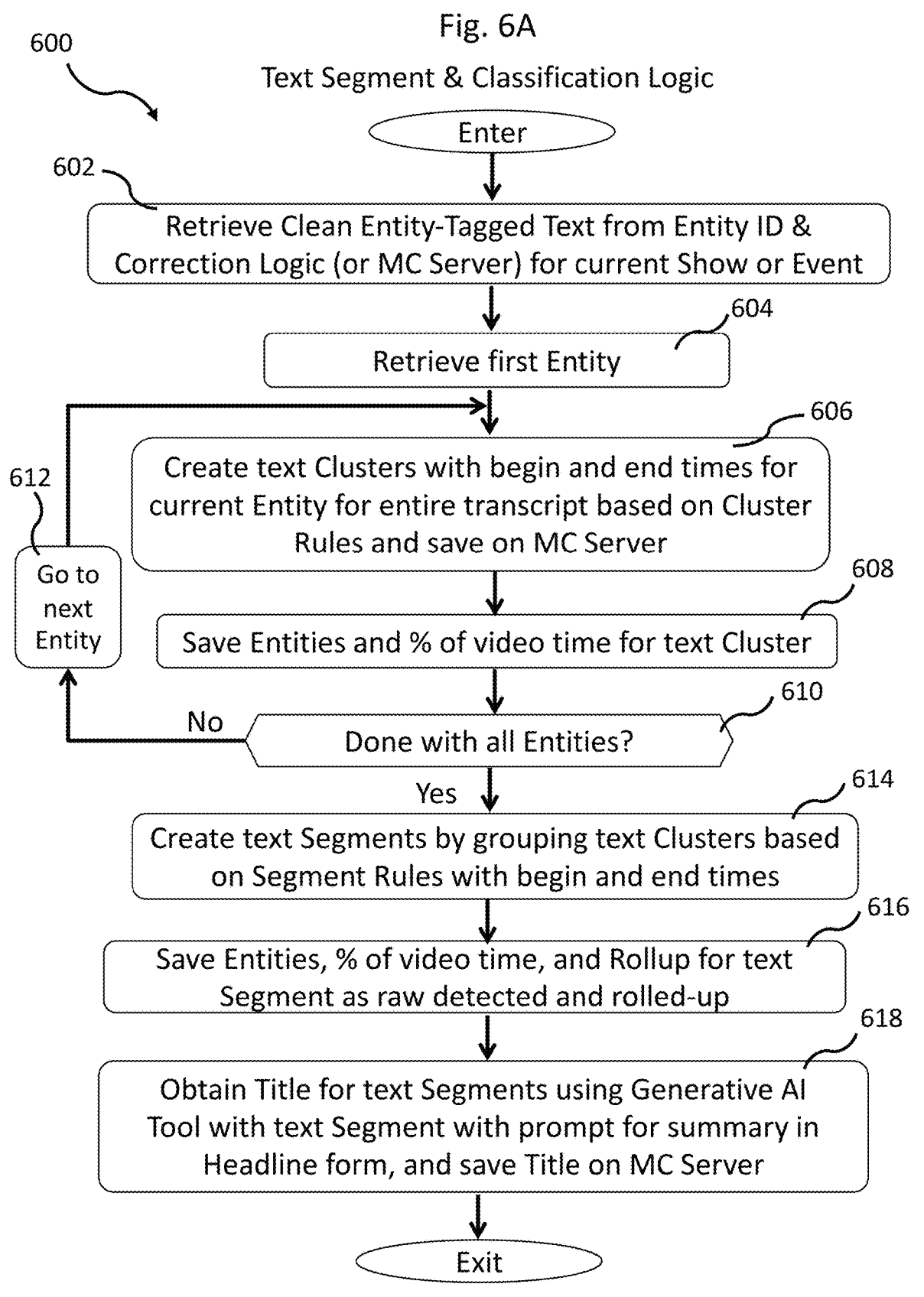

Text Segment & Classification Logic

600

( Enter )

602

Retrieve Clean Entity-Tagged Text from Entity ID & Correction Logic (or MC Server) for current Show or Event

604

Retrieve first Entity

606

Create text Clusters with begin and end times for current Entity for entire transcript based on Cluster Rules and save on MC Server

612

Go to next Entity

608

Save Entities and % of video time for text Cluster

610

Done with all Entities?     No

Yes

614

Create text Segments by grouping text Clusters based on Segment Rules with begin and end times

616

Save Entities, % of video time, and Rollup for text Segment as raw detected and rolled-up

618

Obtain Title for text Segments using Generative AI Tool with text Segment with prompt for summary in Headline form, and save Title on MC Server ( Exit )

Fig. 6C

Text Cluster & Segment Table

675

| Begin - End Time stamp (XX:XX:XX) | Cluster Time Begin/ End Labels | Cluster # | Segment # | Segment Time Begin/ End Labels |
|---|---|---|---|---|
| 00:00:30 | TBC1 | Cluster 1 (SDS – 3 min) | | TBS1 |
| 00:03:30 | TEC1 | | | |
| 00:00:30 | TBC2 | Cluster 2 (FD – 2 min) | Segment 1 | |
| 00:02:30 | TEC2 | | | |
| 00:00:40 | TBC3 | Cluster 3 (UConn – 4 min) | | |
| 00:04:40 | TEC3 | | | TES1 |
| 00:05:10 | TBC4 | Cluster 4 (TBB – 3:20) | Segment 2 | TBS2 |
| 00:08:30 | TEC4 | | . . . | |
| . . . | . . . | . . . | . . . | . . . |

676   678   680   682

Time Begin Segment 1

Segment 1 ⟶ MC 1 (Total: 4:10)

Time End Segment 1

Time Begin Segment 2

Segment 2 ⟶ MC 2 (Total: 3:20)

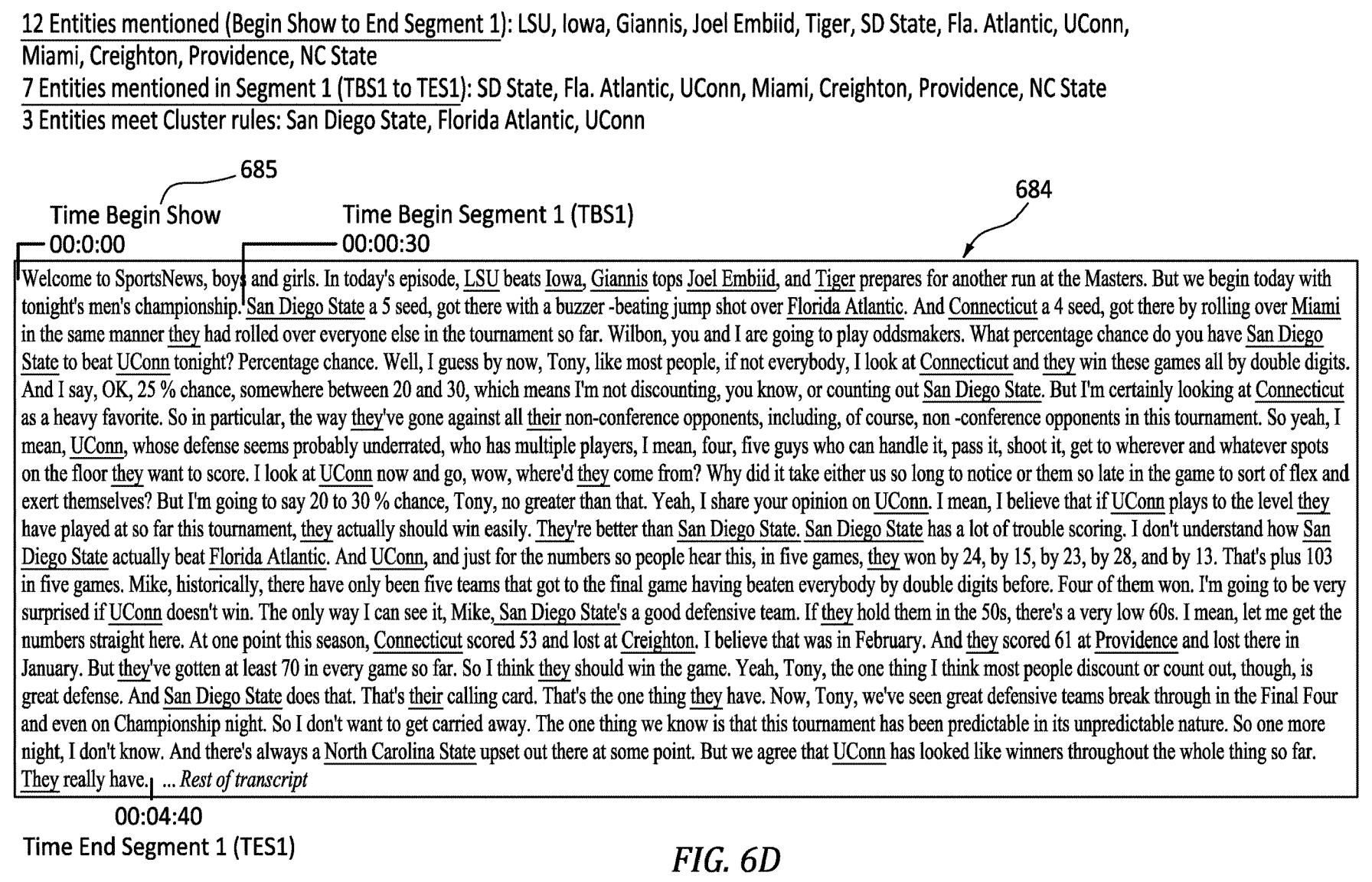

12 Entities mentioned (Begin Show to End Segment 1): LSU, Iowa, Giannis, Joel Embiid, Tiger, SD State, Fla. Atlantic, UConn, Miami, Creighton, Providence, NC State 7 Entities mentioned in Segment 1 (TBS1 to TES1): SD State, Fla. Atlantic, UConn, Miami, Creighton, Providence, NC State 3 Entities meet Cluster rules: San Diego State, Florida Atlantic, UConn

685

684

Time Begin Show       Time Begin Segment 1 (TBS1)
00:0:00                     00:00:30

Welcome to SportsNews, boys and girls. In today's episode, LSU beats Iowa, Giannis tops Joel Embiid, and Tiger prepares for another run at the Masters. But we begin today with tonight's men's championship. San Diego State a 5 seed, got there with a buzzer-beating jump shot over Florida Atlantic. And Connecticut a 4 seed, got there by rolling over Miami in the same manner they had rolled over everyone else in the tournament so far. Wilbon, you and I are going to play oddsmakers. What percentage chance do you have San Diego State to beat UConn tonight? Percentage chance. Well, I guess by now, Tony, like most people, if not everybody, I look at Connecticut and they win these games all by double digits. And I say, OK, 25 % chance, somewhere between 20 and 30, which means I'm not discounting, you know, or counting out San Diego State. But I'm certainly looking at Connecticut as a heavy favorite. So in particular, the way they've gone against all their non-conference opponents in this tournament. So yeah, I mean, UConn, whose defense seems probably underrated, who has multiple players, I mean, four, five guys who can handle it, pass it, shoot it, get to wherever and whatever spots on the floor they want to score. I look at UConn now and go, wow, where'd they come from? Why did it take either us so long to notice or them so late in the game to sort of flex and exert themselves? But I'm going to say 20 to 30 % chance, Tony, no greater than that. Yeah, I share your opinion on UConn. I mean, I believe that if UConn plays to the level they have played at so far this tournament, they actually should win easily. They're better than San Diego State. San Diego State has a lot of trouble scoring. I don't understand how San Diego State actually beat Florida Atlantic. And UConn, and just for the numbers so people hear this, in five games, they won by 24, by 15, by 23, by 28, and by 13. That's plus 103 in five games. Mike, historically, there have only been five teams that got to the final game having beaten everybody by double digits before. Four of them won. I'm going to be very surprised if UConn doesn't win. The only way I can see it, Mike, San Diego State's a good defensive team. If they hold them in the 50s, there's a very low 60s. I mean, let me get the numbers straight here. At one point this season, Connecticut scored 61 at Providence and lost there in January. But they've gotten at least 70 in every game so far. So I think they should win the game. Yeah, Tony, the one thing I think most people discount or count out, though, is great defense. And San Diego State does that. That's their calling card. That's the one thing they have. Now, Tony, we've seen great defensive teams break through in the Final Four and even on Championship night. So I don't want to get carried away. The one thing we know is that this tournament has been predictable in its unpredictable nature. So one more night, I don't know. And there's always a North Carolina State upset out there at some point. But we agree that UConn has looked like winners throughout the whole thing so far. They really have. ...Rest of transcript 00:04:40
Time End Segment 1 (TES1)

*FIG. 6D*

Cluster 1 - San Diego State (SDS): 3 min of 30 min = 10% (of Total Show video)

Time Begin Cluster 1 (TBC1)
00:00:30

686
684

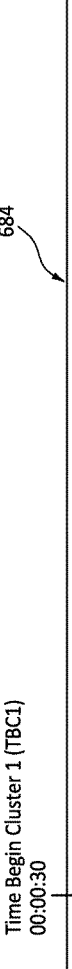

Welcome to SportsNews, boys and girls. In today's episode, LSU beats Iowa, Giannis tops Joel Embiid, and Tiger prepares for another run at the Masters. But we begin today with tonight's men's championship, San Diego State a 5 seed, got there with a buzzer -beating jump shot over Florida Atlantic. And Connecticut a 4 seed, got there by rolling over Miami in the same manner they had rolled over everyone else in the tournament so far. Wilbon, you and I are going to play oddsmakers. What percentage chance do you have San Diego State to beat UConn tonight? Percentage chance. Well, I guess by now, Tony, like most people, if not everybody, I look at Connecticut and they win these games all by double digits. And I say, OK, 25 % chance, somewhere between 20 and 30, which means I'm not discounting, you know, or counting out San Diego State. But I'm certainly looking at Connecticut as a heavy favorite. So in particular, the way they've gone against all their non-conference opponents, including, of course, non -conference opponents in this tournament. So yeah, I mean, UConn, whose defense seems probably underrated, who has multiple players, I mean, four, five guys who can handle it, pass it, shoot it, get to wherever and whatever spots on the floor they want to score. I look at UConn now and go, wow, where'd they come from? Why did it take either us so long to notice or them so late in the game to sort of flex and exert themselves? But I'm going to say 20 to 30 % chance, Tony, no greater than that. Yeah, I share your opinion on UConn. I mean, I believe that if UConn plays to the level they have played at so far this tournament, they actually should win easily. They're better than San Diego State. San Diego State has a lot of trouble scoring. I don't understand how San Diego State actually beat Florida Atlantic. And UConn, and just for the numbers so people hear this, in five games, they won by 24, by 15, by 23, by 28, and by 13. That's plus 103 in five games. Mike, historically, there have only been five teams that got to the final game having beaten everybody by double digits before. Four of them won. I'm going to be very surprised if UConn doesn't win. The only way I can see it, Mike, San Diego State's a good defensive team. If they hold them in the 50s, there's a very low 60s. I mean, let me get the numbers straight here. At one point this season, Connecticut scored 53 and lost at Creighton. I believe that was in February. And they scored 61 at Providence and lost there in January. But they've gotten at least 70 in every game so far. So I think they should win the game. Yeah, Tony, the one thing I think most people discount or count out, though, is great defense. And San Diego State does that. That's their calling card. That's the one thing they have. Now, Tony, we've seen great defensive teams break through in the Final Four and even on Championship night. So I don't want to get carried away. The one thing we know is that this tournament has been predictable in its unpredictable nature. So one more night, I don't know. And there's always a North Carolina State upset out there at some point. But we agree that UConn has looked like winners throughout the whole thing so far. They really have. ... Rest of transcript 00:03:30
Time End Cluster 1 (TEC1)

Cluster 2 - Florida Atlantic (FA): 2m of 30m Total = 6% (of Total Show video)

Time Begin Cluster 2 (TBC2)
00:00:30

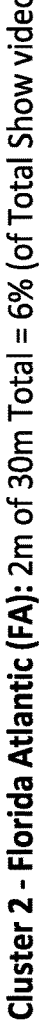

Welcome to SportNews, boys and girls. In today's episode, LSU beats Iowa, Giannis tops Joel Embiid, and Tiger prepares for another run at the Masters. But we begin today with tonight's men's championship. San Diego State a 5 seed, got there with a buzzer -beating jump shot over Florida Atlantic. And Connecticut a 4 seed, got there by rolling over Miami in the same manner they had rolled over everyone else in the tournament so far. Wilbon, you and I are going to play oddsmakers. What percentage chance do you have San Diego State to beat UConn tonight? Percentage chance. Well, I guess by now, Tony, like most people, if not everybody, I look at Connecticut and they win these games all by double digits. And I say, OK, 25 % chance, somewhere between 20 and 30, which means I'm not discounting, you know, or counting out San Diego State. But I'm certainly looking at Connecticut as a heavy favorite. So in particular, the way they've gone against all their non-conference opponents, including, of course, non -conference opponents in this tournament. So yeah, I mean, UConn, whose defense seems probably underrated, who has multiple players, I mean, four, five guys who can handle it, pass it, shoot it, get to wherever and whatever spots on the floor they want to score. I look at UConn now and go, wow, where'd they come from? Why did it take either us so long to notice or them so late in the game to sort of flex and exert themselves? But I'm going to say 20 to 30 % chance, Tony, no greater than that. Yeah, I share your opinion on UConn. I mean, I believe that if UConn plays to the level they have played at so far this tournament, they actually should win easily. They're better than San Diego State. San Diego State has a lot of trouble scoring. I don't understand how San Diego State actually beat Florida Atlantic. And UConn, and just for the numbers so people hear this, in five games, they won by 24, by 15, by 23, by 28, and by 13. That's plus 103 in five games. Mike, historically, there have only been five teams that got to the final game having beaten everybody by double digits before. Four of them won. I'm going to be very surprised if UConn doesn't win. The only way I can see it, Mike, San Diego State's a good defensive team. If they hold them in the 50s, there's a very low 60s. I mean, let me get the numbers straight here. At one point this season, Connecticut scored 61 at Providence and lost there in January. But they've gotten at least 70 in every game so far. So I think they should win the game. Yeah, Tony, the one thing I think most people discount or count out, though, is great defense. And San Diego State does that. That's their calling card. That's the one thing they have. Now, Tony, we've seen great defensive teams break through in the Final Four and even on Championship night. So I don't want to get carried away. The one thing we know is that this tournament has been predictable in its unpredictable nature. So one more night, I don't know. And there's always a North Carolina State upset out there at some point. But we agree that UConn has looked like winners throughout the whole thing so far. They really have. *... Rest of transcript*

00:02:30

Time End Cluster 2 (TEC2)

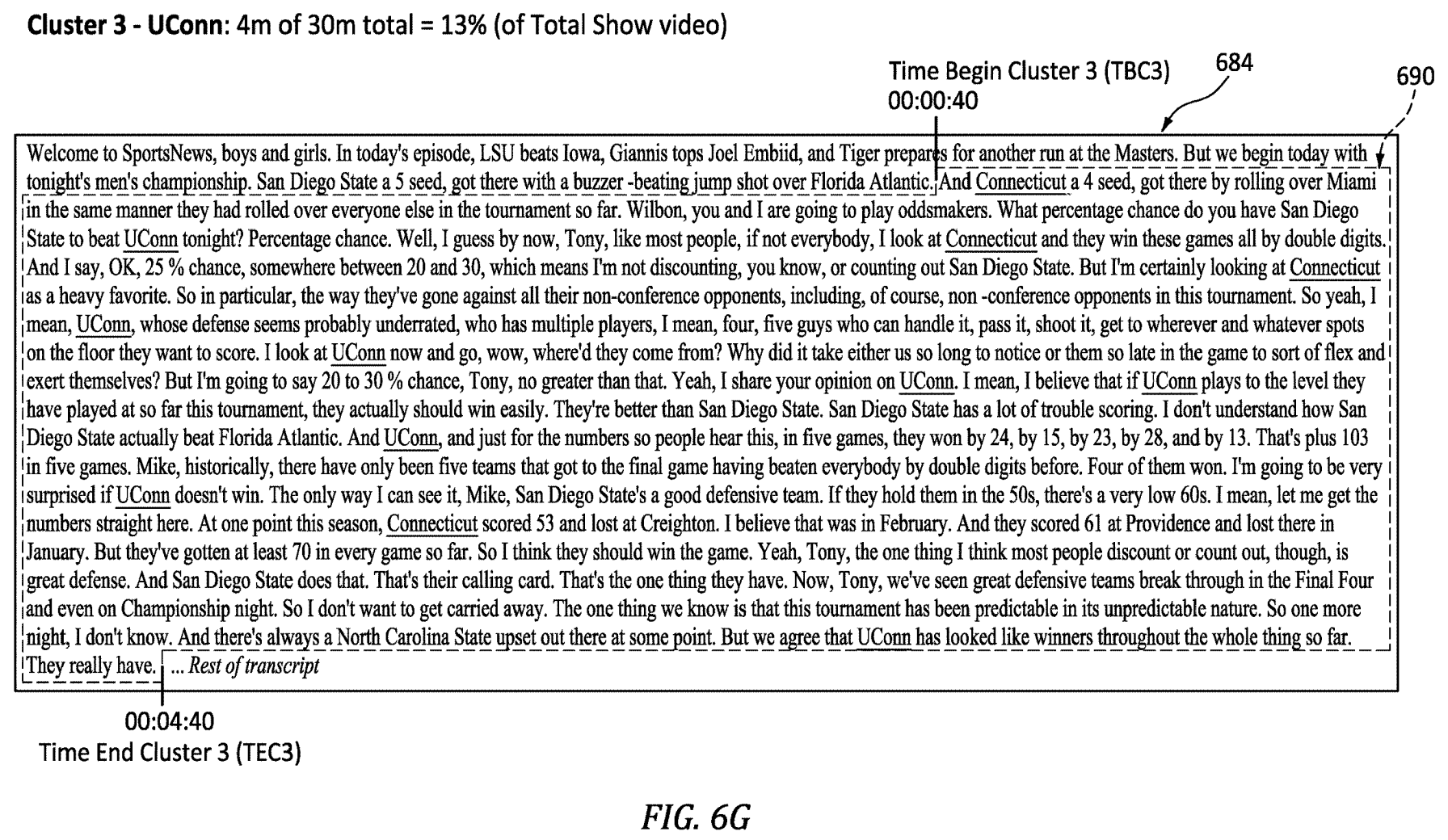

690

Cluster 3 - UConn: 4m of 30m total = 13% (of Total Show video)

Time Begin Cluster 3 (TBC3)     684
00:00:40

Welcome to SportsNews, boys and girls. In today's episode, LSU beats Iowa, Giannis tops Joel Embiid, and Tiger prepares for another run at the Masters. But we begin today with tonight's men's championship. San Diego State a 5 seed, got there with a buzzer-beating jump shot over Florida Atlantic. And Connecticut a 4 seed, got there by rolling over Miami in the same manner they had rolled over everyone else in the tournament so far. Wilbon, you and I are going to play oddsmakers. What percentage chance do you have San Diego State to beat UConn tonight? Percentage chance. Well, I guess by now, Tony, like most people, if not everybody, I look at Connecticut and they win these games all by double digits. And I say, OK, 25 % chance, somewhere between 20 and 30, which means I'm not discounting, you know, or counting out San Diego State. But I'm certainly looking at Connecticut as a heavy favorite. So in particular, the way they've gone against all their non-conference opponents, including, of course, non -conference opponents in this tournament. So yeah, I mean, UConn, whose defense seems probably underrated, who has multiple players, I mean, four, five guys who can handle it, pass it, shoot it, get to wherever and whatever spots on the floor they want to score. I look at UConn now and go, wow, where'd they come from? Why did it take either us so long to notice or them so late in the game to sort of flex and exert themselves? But I'm going to say 20 to 30 % chance, Tony, no greater than that. Yeah, I share your opinion on UConn. I mean, I believe that if UConn plays to the level they have played at so far this tournament, they actually should win easily. They're better than San Diego State. San Diego State has a lot of trouble scoring. I don't understand how San Diego State actually beat Florida Atlantic. And UConn, and just for the numbers so people hear this, in five games, they won by 24, by 15, by 23, by 28, and by 13. That's plus 103 in five games. Mike, historically, there have only been five teams that got to the final game having beaten everybody by double digits before. Four of them won. I'm going to be very surprised if UConn doesn't win. The only way I can see it, Mike, San Diego State's a good defensive team. If they hold them in the 50s, there's a very low 60s. I mean, let me get the numbers straight here. At one point this season, Connecticut scored 53 and lost at Creighton. I believe that was in February. And they scored 61 at Providence and lost there in January. But they've gotten at least 70 in every game so far. So I think they should win the game. Yeah, Tony, the one thing I think most people discount or count out, though, is great defense. And San Diego State does that. That's their calling card. That's the one thing they have. Now, Tony, we've seen great defensive teams break through in the Final Four and even on Championship night. So I don't want to get carried away. The one thing we know is that this tournament has been predictable in its unpredictable nature. So one more night, I don't know. And there's always a North Carolina State upset out there at some point. But we agree that UConn has looked like winners throughout the whole thing so far. They really have. *... Rest of transcript*

00:04:40
Time End Cluster 3 (TEC3)

*FIG. 6G*

Figure 6H:
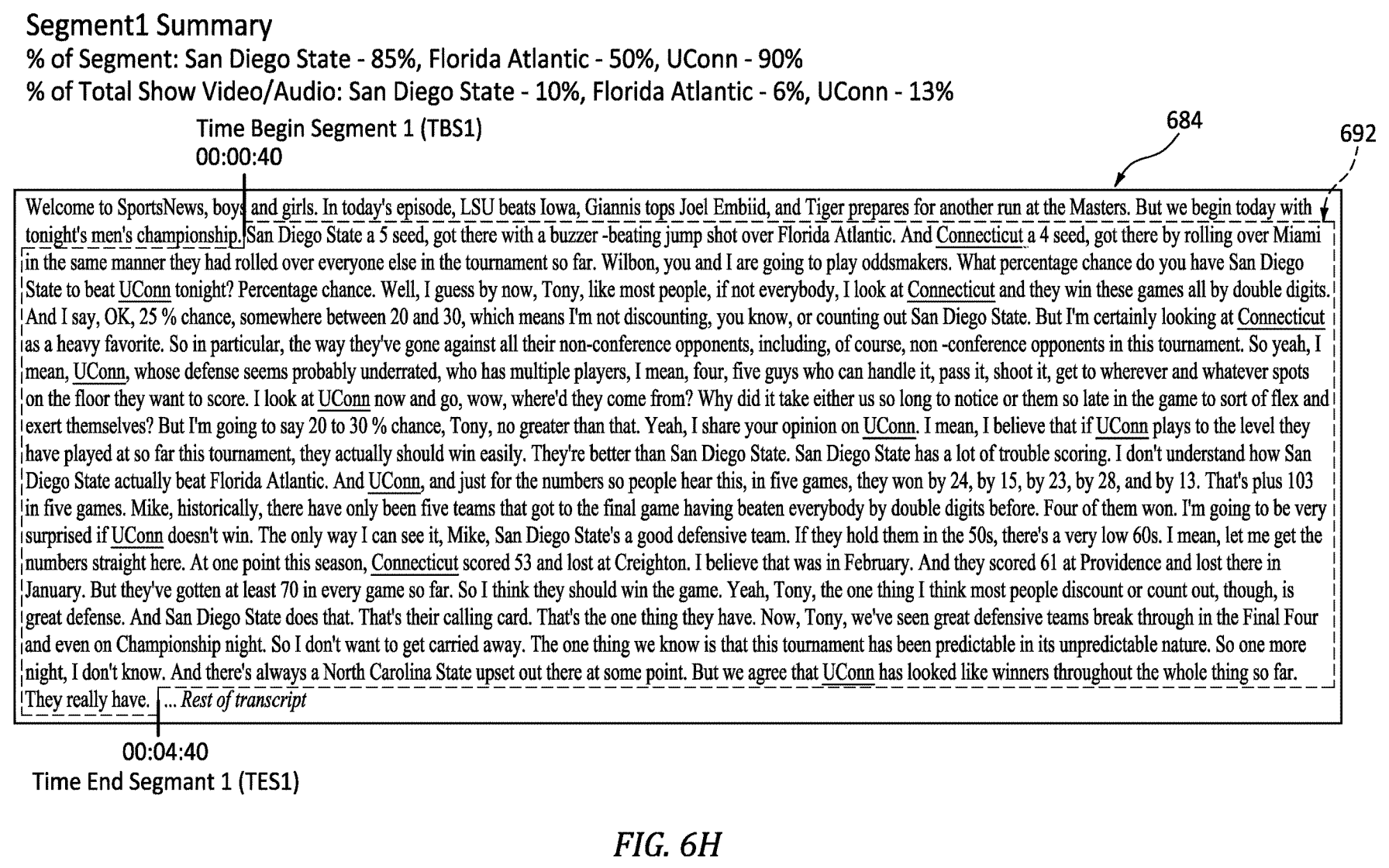

Segment1 Summary

% of Segment: San Diego State - 85%, Florida Atlantic - 50%, UConn - 90%

% of Total Show Video/Audio: San Diego State - 10%, Florida Atlantic - 6%, UConn - 13%

Time Begin Segment 1 (TBS1)
00:00:40

692

684

Welcome to SportsNews, boys and girls. In today's episode, LSU beats Iowa, Giannis tops Joel Embiid, and Tiger prepares for another run at the Masters. But we begin today with tonight's men's championship. San Diego State a 5 seed, got there with a buzzer -beating jump shot over Florida Atlantic. And Connecticut a 4 seed, got there by rolling over Miami in the same manner they had rolled over everyone else in the tournament so far. Wilbon, you and I are going to play oddsmakers. What percentage chance do you have San Diego State to beat UConn tonight? Percentage chance. Well, I guess by now, Tony, like most people, if not everybody, I look at Connecticut and they win these games all by double digits. And I say, OK, 25 % chance, somewhere between 20 and 30, which means I'm not discounting, you know, or counting out San Diego State. But I'm certainly looking at Connecticut as a heavy favorite. So in particular, the way they've gone against all their non-conference opponents, including, of course, non –conference opponents in this tournament. So yeah, I mean, UConn, whose defense seems probably underrated, who has multiple players, I mean, four, five guys who can handle it, pass it, shoot it, get to wherever and whatever spots on the floor they want to score. I look at UConn now and go, wow, where'd they come from? Why did it take either us so long to notice or them so late in the game to sort of flex and exert themselves? But I'm going to say 20 to 30 % chance, Tony, no greater than that. Yeah, I share your opinion on UConn. I mean, I believe that if UConn plays to the level they have played at so far this tournament, they actually should win easily. They're better than San Diego State. San Diego State has a lot of trouble scoring. I don't understand how San Diego State actually beat Florida Atlantic. And UConn, and just for the numbers so people hear this, in five games, they won by 24, by 15, by 23, by 28, and by 13. That's plus 103 in five games. Mike, historically, there have only been five teams that got to the final game having beaten everybody by double digits before. Four of them won. I'm going to be very surprised if UConn doesn't win. The only way I can see it, Mike, San Diego State's a good defensive team. If they hold them in the 50s, there's a very low 60s. I mean, let me get the numbers straight here. At one point this season, Connecticut scored 53 and lost at Creighton. I believe that was in February. And they scored 61 at Providence and lost there in January. But they've gotten at least 70 in every game so far. So I think they should win the game. Yeah, Tony, the one thing I think most people discount or count out, though, is great defense. And San Diego State does that. That's their calling card. That's the one thing they have. Now, Tony, we've seen great defensive teams break through in the Final Four and even on Championship night. So I don't want to get carried away. The one thing we know is that this tournament has been predictable in its unpredictable nature. So one more night, I don't know. And there's always a North Carolina State upset out there at some point. But we agree that UConn has looked like winners throughout the whole thing so far. They really have. *... Rest of transcript*

00:04:40
Time End Segmant 1 (TES1)

Segment Entity Listing Table

693

| Segment | Order of appearance | Entities Found in Segment | Entities Meeting Cluster /Segment Rules |
|---|---|---|---|
| 1 | 1 | San Diego State | San Diego State |
| | 2 | Florida Atlantic | Florida Atlantic |
| | 3 | Uconn | Uconn |
| | 4 | Miami | |
| | 5 | Creighton | |
| | 6 | Providence | |
| | 7 | North Carolina State | |
| Other Segments | 1 | Entity 1 | |
| | 2 | Entity 2 | Entity 2 |
| . . . | Others | Others | Others |

698

SOCCER NEWS

Current Tagging

Soccer
La Liga

689

Enhanced Tagging

| Soccer | - 95% |
| La Liga | - 31% |
| Champions League | - 10% |
| Team 1 | - 8% |
| Team 2 | - 7% |
| Team 3 | - 6% |
| Player 1 | - 5% |
| Player 2 | - 4% |
| Player 3 | - 3% |
| Team 4 | - 3% |

691

696

Sports Talk Show

Current Tagging

MLB
NBA
NFL

685

Enhanced Tagging

| NBA | 11.9% |
| NFL | 10.4% |
| NFL Team 1 | 9.9% |
| NHL | 9.1% |
| NBA Player 1 | 8.9% |
| NBA Player 2 | 8.9% |
| NHL Team 1 | 8.3% |
| MLB | 5.7% |
| MLB Player 3 | 3.6% |
| NBA Player 4 | 3.6% |

Media Clip (MC) Creation Logic ( Enter )

Figure 7A:
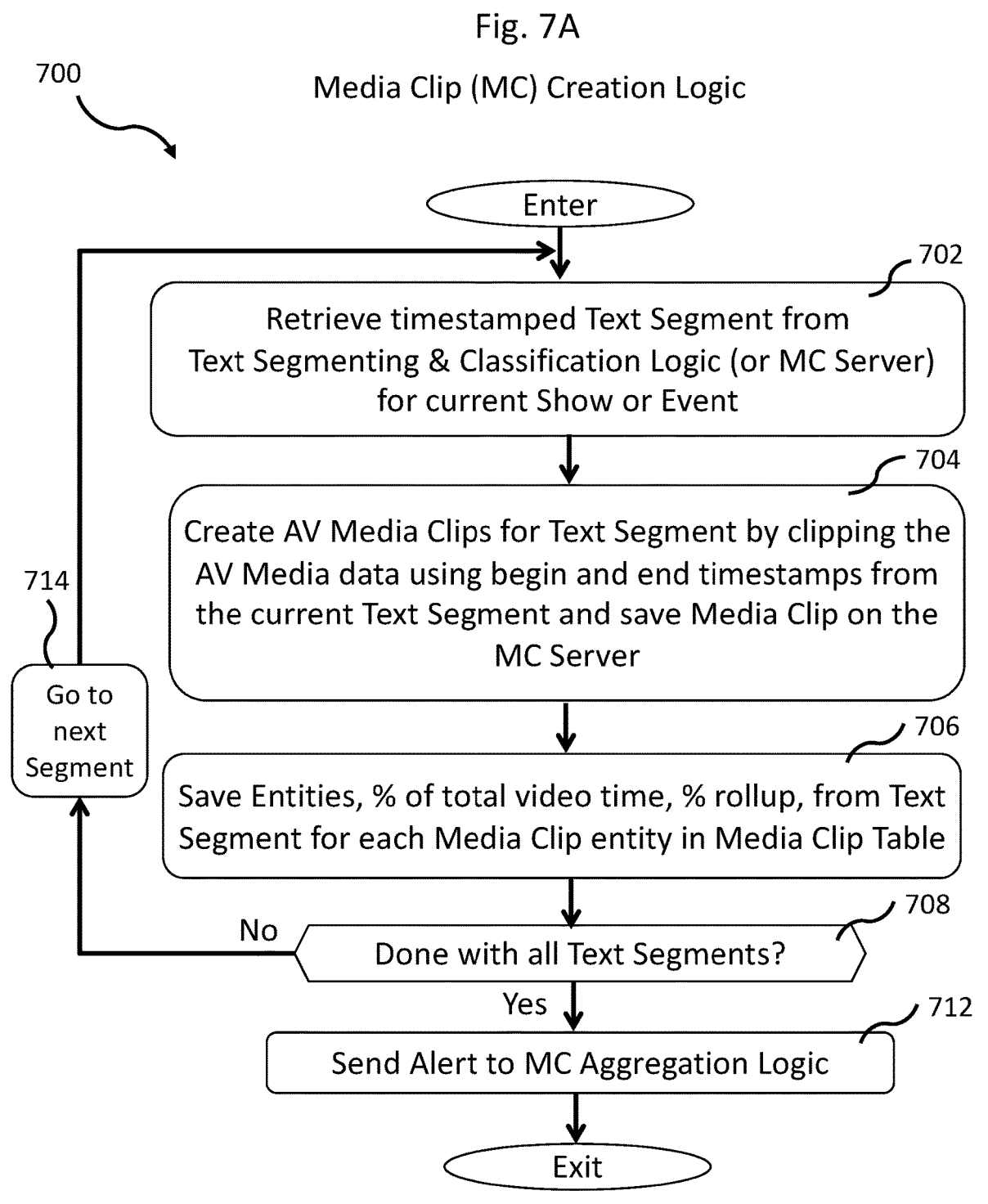

702

Retrieve timestamped Text Segment from
Text Segmenting & Classification Logic (or MC Server)
for current Show or Event

704

Create AV Media Clips for Text Segment by clipping the
AV Media data using begin and end timestamps from
the current Text Segment and save Media Clip on the
MC Server

714

Go to
next
Segment

706

Save Entities, % of total video time, % rollup, from Text
Segment for each Media Clip entity in Media Clip Table

708

No ⟨ Done with all Text Segments? ⟩

Yes

712

Send Alert to MC Aggregation Logic ( Exit )

AV Media Data

| A/V Timestamp | A/V Frame |
|---|---|
| ... | ... |
| 00:00:30 | Frame 1 |
| | |
| | |
| | |
| | |
| 00:04:40 | Frame N |
| ... | ... |
| 00:05:10 | Frame 1 |
| ... | ... |

MC1

MC2

752

Text Clusters & Segments

| Begin - End Time stamp (XX:XX:XX) | Cluster Time Begin/ End Labels | Cluster # | Segment # | Segment Time Begin/ End Labels |
|---|---|---|---|---|
| 00:00:30 | TBC1 | Cluster 1 (SDS - 3 min) | | TBS1 00:00:30 |
| 00:03:30 | TEC1 | | | |
| 00:00:30 | TBC2 | Cluster 2 (FD - 2 min) | Segment 1 | |
| 00:02:30 | TEC2 | | | |
| 00:00:40 | TBC3 | Cluster 3 (UConn - 4 min) | | |
| 00:04:40 | TEC3 | | | TES1 00:04:40 |
| 00:05:10 | TBC4 | Cluster 4 (TBB - 3:20) | Segment 2 | TBS2 00:05:10 |
| 00:08:30 | TEC4 | | ... | |
| ... | ... | ... | ... | ... |

675

TBS1

676

678

680

TES1

MC Listing Table

770

| MC No. 772 | Show 776 | Date 778 | Begin/End Times 780 | MC Length 782 | MC Link 784 | MC Title 786 | Entity List 788 | Entity % Tot Video Time 790 | Entity % Rollup 792 |
|---|---|---|---|---|---|---|---|---|---|
| MC 1 | Show A | 2/16/23 | 00:00:30/ 00:04:40 | 4:10 | Link1 | T1 | SDS FS UConn | SDS – 10% FA – 6% UConn – 13% | SDS – 12% FA – 14% UConn – 18% NCAA – 20% |
| MC 2 | Show A | 2/16/23 | 00:05:10/ 00:07:55 | 2:45 | Link2 | T2 | ... | ... | ... |
| MC 3 | Show A | 2/16/23 | 00:08:30/ 00:10:40 | 2:10 | Link3 | T3 | | | |
| MC 4 | Show A | 2/16/23 | 00:11:02/ 00:15:20 | 4:18 | Link4 | T4 | | | |
| MC 5 | Show A | 2/16/23 | 00:15:30/ 00:17:55 | 2:25 | Link5 | T5 | | | |
| ... | ... | ... | ... | ... | ... | ... | ... | ... | ... |

Figure 8A:
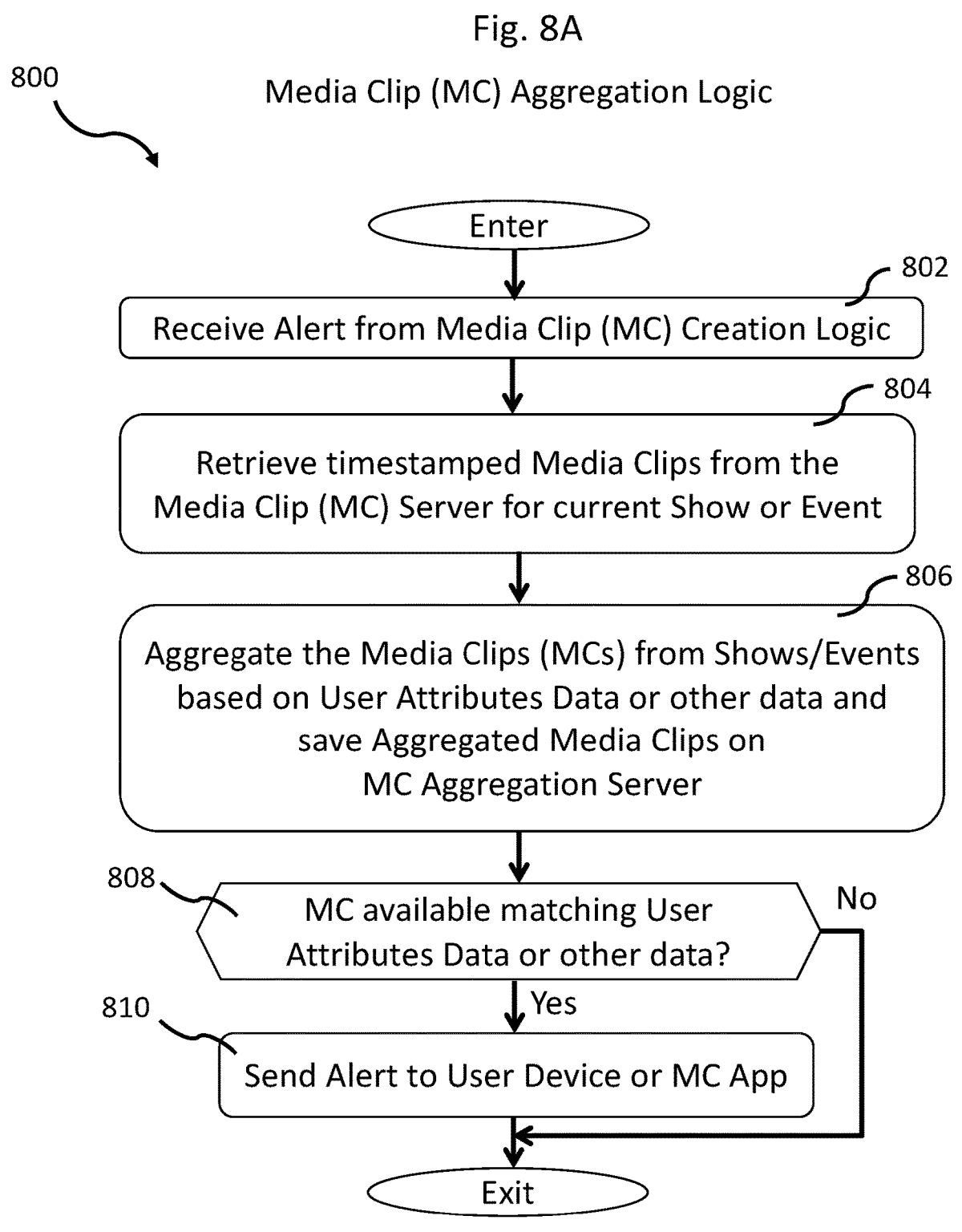

Media Clip (MC) Aggregation Logic

```
            ( Enter )
               │
               ▼                                     802
  ┌──────────────────────────────────────────────┐
  │  Receive Alert from Media Clip (MC) Creation Logic │
  └──────────────────────────────────────────────┘
               │
               ▼                                     804
  ┌──────────────────────────────────────────────┐
  │    Retrieve timestamped Media Clips from the   │
  │  Media Clip (MC) Server for current Show or Event │
  └──────────────────────────────────────────────┘
               │
               ▼                                     806
  ┌──────────────────────────────────────────────┐
  │ Aggregate the Media Clips (MCs) from Shows/Events │
  │  based on User Attributes Data or other data and  │
  │        save Aggregated Media Clips on             │
  │            MC Aggregation Server                  │
  └──────────────────────────────────────────────┘
               │
               ▼
   808
  ╱────────────────────────────────────╲     No
  │   MC available matching User         │──────┐
  │  Attributes Data or other data?      │      │
  ╲────────────────────────────────────╱       │
               │ Yes                            │
   810         ▼                                │
  ┌──────────────────────────────────────┐      │
  │  Send Alert to User Device or MC App   │      │
  └──────────────────────────────────────┘      │
               │                                │
               ▼◄───────────────────────────────┘
            ( Exit )
```

Fig. 8B

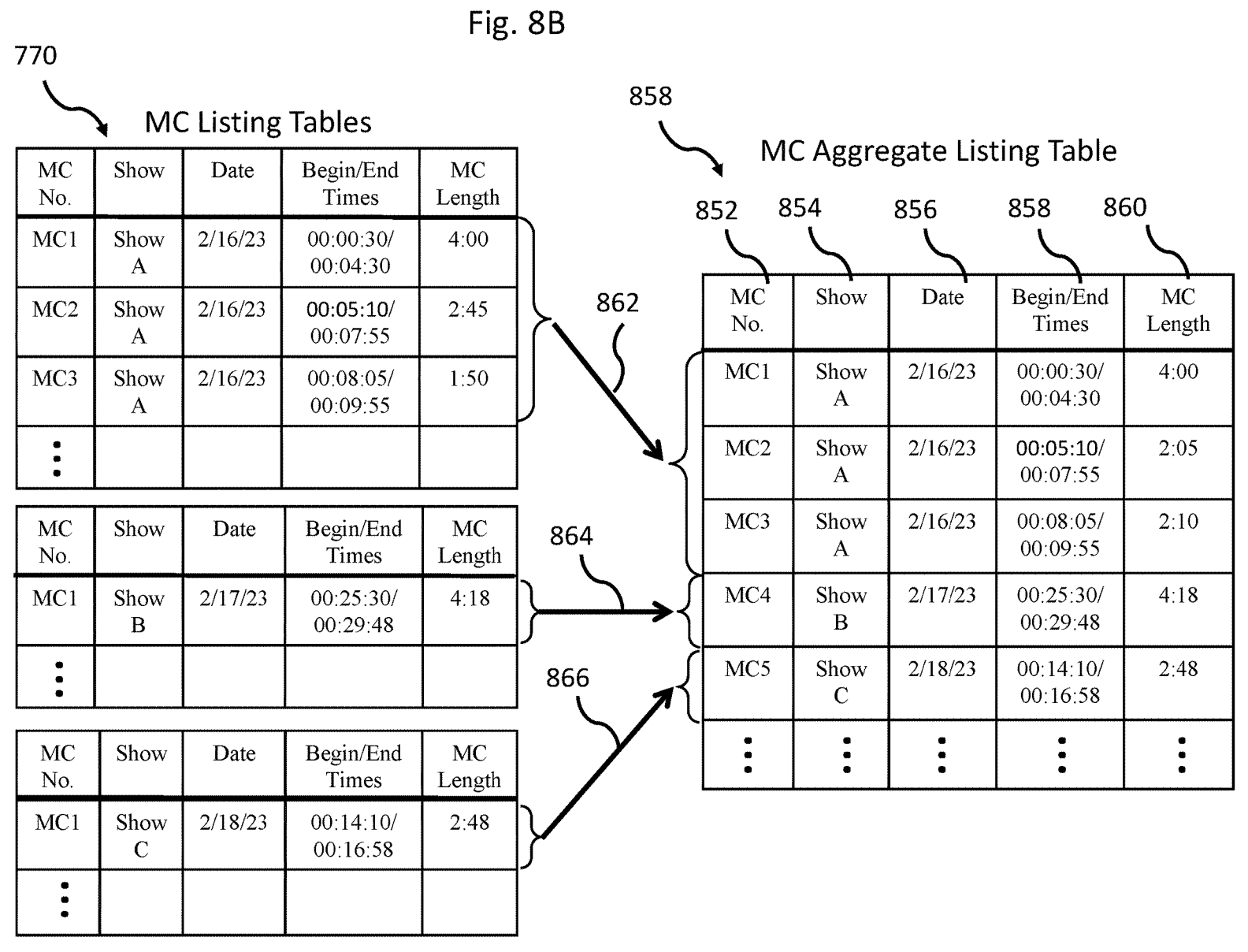

MC Aggregate Listing Table

858

| MC No. | Show | Date | Begin/End Times | MC Length |
|--------|------|------|-----------------|-----------|
| 852 | 854 | 856 | 858 | 860 |
| MC1 | Show A | 2/16/23 | 00:00:30/ 00:04:30 | 4:00 |
| MC2 | Show A | 2/16/23 | 00:05:10/ 00:07:55 | 2:05 |
| MC3 | Show A | 2/16/23 | 00:08:05/ 00:09:55 | 2:10 |
| MC4 | Show B | 2/17/23 | 00:25:30/ 00:29:48 | 4:18 |
| MC5 | Show C | 2/18/23 | 00:14:10/ 00:16:58 | 2:48 |
| . . . | . . . | . . . | . . . | . . . |

862

864

866

MC Listing Tables

770

| MC No. | Show | Date | Begin/End Times | MC Length |
|--------|------|------|-----------------|-----------|
| MC1 | Show A | 2/16/23 | 00:00:30/ 00:04:30 | 4:00 |
| MC2 | Show A | 2/16/23 | 00:05:10/ 00:07:55 | 2:45 |
| MC3 | Show A | 2/16/23 | 00:08:05/ 00:09:55 | 1:50 |
| . . . | | | | |

| MC No. | Show | Date | Begin/End Times | MC Length |
|--------|------|------|-----------------|-----------|
| MC1 | Show B | 2/17/23 | 00:25:30/ 00:29:48 | 4:18 |
| . . . | | | | |

| MC No. | Show | Date | Begin/End Times | MC Length |
|--------|------|------|-----------------|-----------|
| MC1 | Show C | 2/18/23 | 00:14:10/ 00:16:58 | 2:48 |
| . . . | | | | |

Fig. 8C

Show/Event Metadata Table

870

| Show Name | Host (s) | Host talk Speed | Show Duration | Airing Schedule/ Start Time |
|---|---|---|---|---|
| Show A | Host A; Host B | Fast; Med | 30 min | Every Thursday 4pm ET |
| Show B | Host C; Host D | Slow; Med | 1 hr | Every Day 6pm ET |
| ... | ... | ... | ... | ... |

Fig. 8D

User Attributes Table

876

| User ID (878) | Sports (880) | Teams (882) | Players (884) | Shows (886) | Age (888) | Gender (890) | MC Likes (892) | MC DisLikes (894) | Alert Settings (896) | Aggreg. Settings (898) |
|---|---|---|---|---|---|---|---|---|---|---|
| User 1 | Football; Hockey | Team A; Team B | Player A; Player B | Show A; Show B | 30 | M | MC1; MC4 | MC2; MC5 | Team A Show A | Likes; Shows |
| User 2 | Football; Baseball ; | Team C; Team D | Player C; Player D | Show C | 45 | M | MC1; MC3; MC5 | None | None | Likes; Players |
| User 3 | Football; | Team E; | Player E; | Show D | 52 | F | MC2 | MC1; MC4; MC5 | Team Show D | Shows; Teams |
| ... | ... | ... | ... | ... | ... | ... | ... | ... | ... | ... |

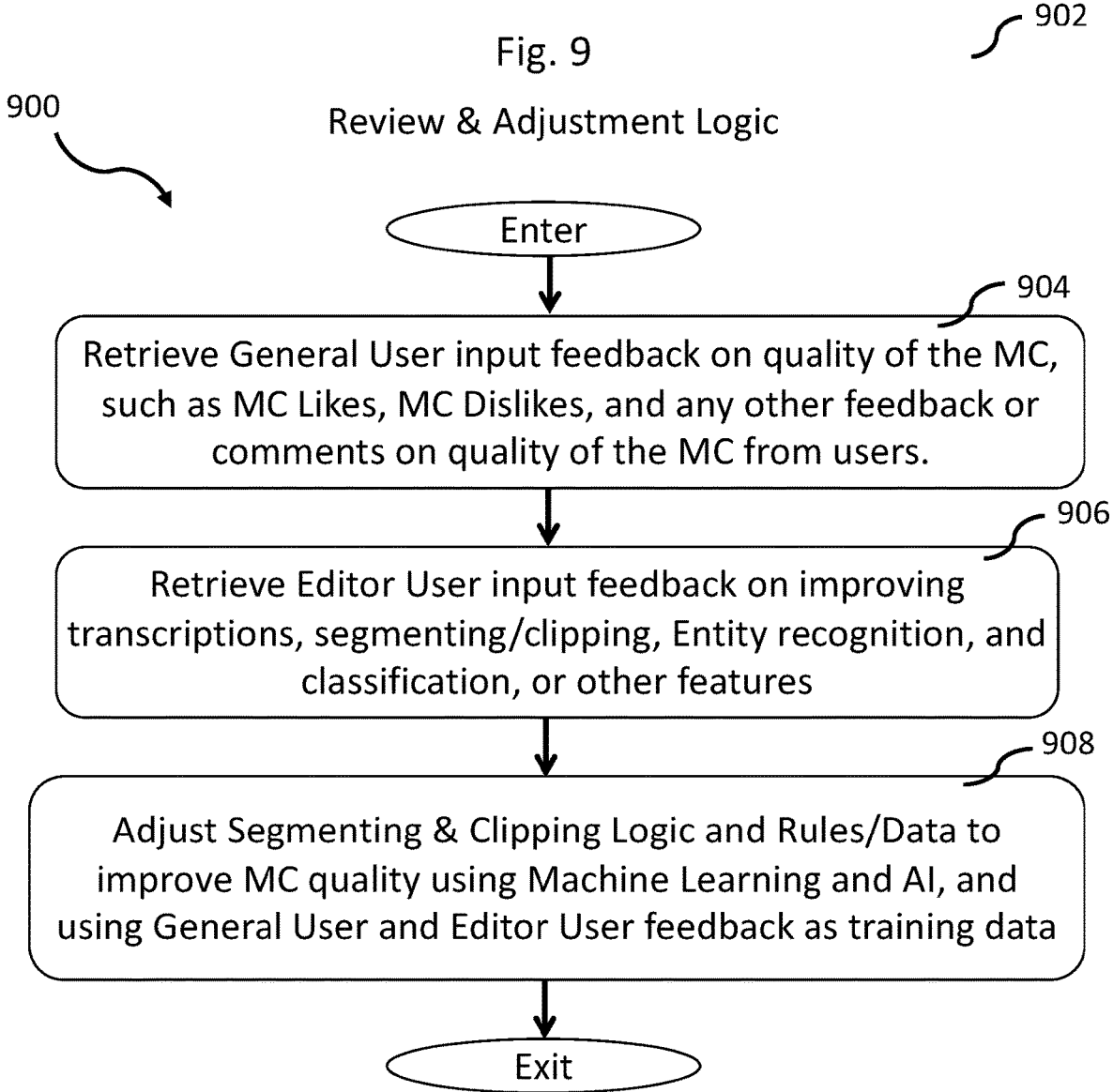

Review & Adjustment Logic                902

Enter

904

Retrieve General User input feedback on quality of the MC, such as MC Likes, MC Dislikes, and any other feedback or comments on quality of the MC from users.

906

Retrieve Editor User input feedback on improving transcriptions, segmenting/clipping, Entity recognition, and classification, or other features

908

Adjust Segmenting & Clipping Logic and Rules/Data to improve MC quality using Machine Learning and AI, and using General User and Editor User feedback as training data Exit MC App Logic

MC Editor App Logic ( Enter )

Figure 10C:
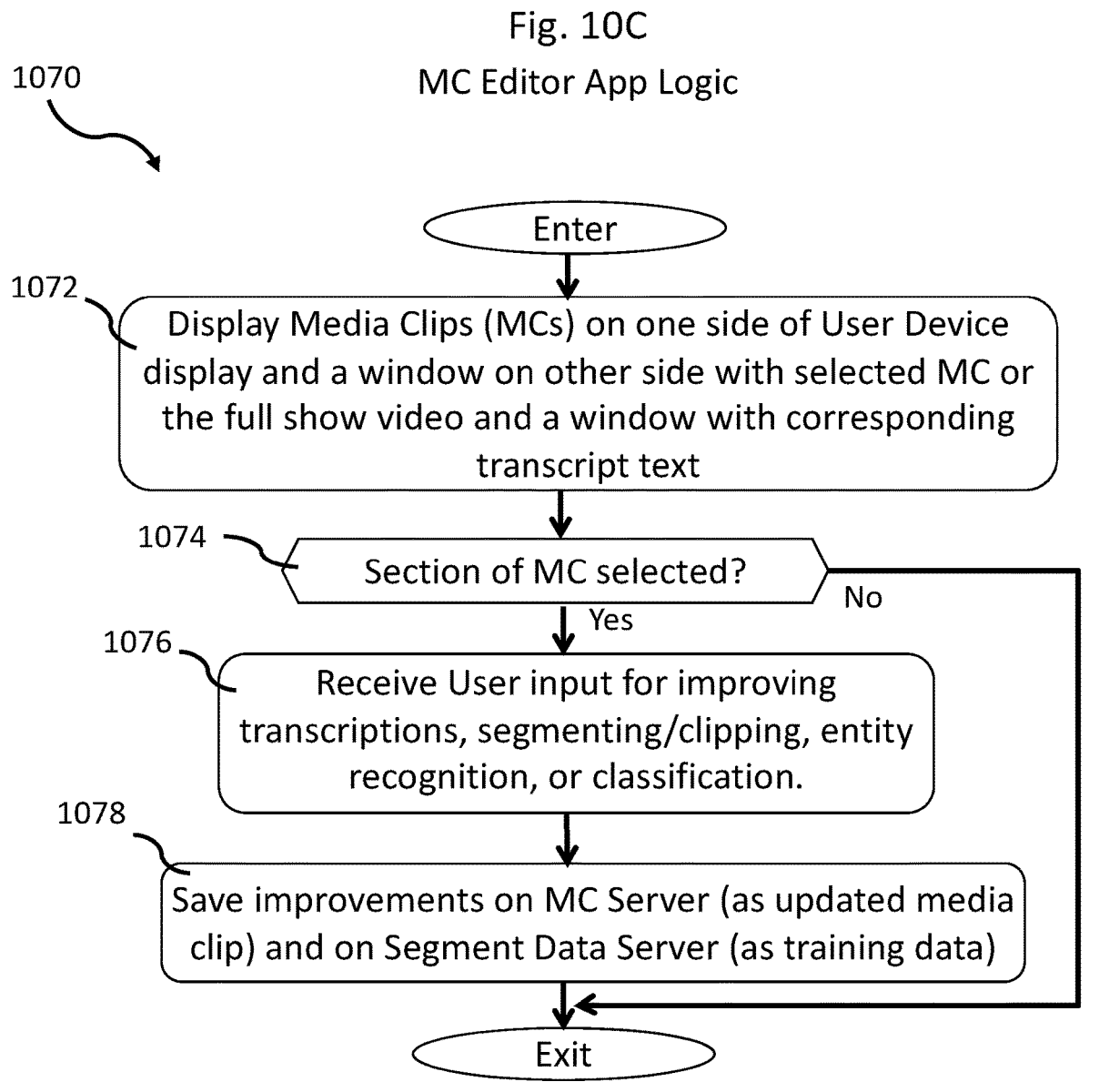

1072

Display Media Clips (MCs) on one side of User Device display and a window on other side with selected MC or the full show video and a window with corresponding transcript text

1074

Section of MC selected?

No

Yes

1076

Receive User input for improving transcriptions, segmenting/clipping, entity recognition, or classification.

1078

Save improvements on MC Server (as updated media clip) and on Segment Data Server (as training data)

( Exit )

SYSTEM AND METHOD FOR VIDEO/AUDIO COMPREHENSION AND AUTOMATED CLIPPING

BACKGROUND

The process of reviewing and analyzing long-form and live media content, such as video and audio, to create short-form video-on-demand (VOD) or audio-on-demand (AOD) clips or segments for consumption by users, is a process that requires extensive time due to manual processes. Such media clips are currently created via manual inspection and detailed review of the media content to identify specific topics in the longer video, e.g., a sports show or event or other shows or events, to create the clips. Such a process is slow and results in a very limited quantity of short VOD media clips for consumption by users or consumers.

Accordingly, it would be desirable to have a system and method that increases the amount of such clips and decreases the time to create them, thereby providing a greater number of short VOD/AOD media content clips that are of interest to sports fans or the general public.

BRIEF DESCRIPTION OF THE DRAWINGS

FIG. 3 is a flow diagram of one of the components in FIG. 1, in accordance with embodiments of the present disclosure.

FIG. 4 is a flow diagram of one of the components in FIG. 2, in accordance with embodiments of the present disclosure.

FIG. 5C is a table showing a sample listing of Entities (or topics), in accordance with embodiments of the present disclosure.

FIG. 5D is a table showing Segment and Clipping Rules/Data, in accordance with embodiments of the present disclosure.

FIG. 6A is a flow diagram of one of the components in FIG. 2, in accordance with embodiments of the present disclosure.

FIG. 6C is a table showing text Clusters and Segments data, in accordance with embodiments of the present disclosure.

FIG. 6D is a diagram showing a portion of transcript text after Entities have been identified, in accordance with embodiments of the present disclosure.

FIG. 6E is a diagram showing a portion of transcript text after a first text Cluster has been identified, in accordance with embodiments of the present disclosure.

FIG. 6F is a diagram showing a portion of transcript text after a second text Cluster has been identified, in accordance with embodiments of the present disclosure.

FIG. 6G is a diagram showing a portion of transcript text after a third text Cluster has been identified, in accordance with embodiments of the present disclosure.

FIG. 6H is a diagram showing a portion of transcript text after a text Segment has been identified, in accordance with embodiments of the present disclosure.

FIG. 6I is a table showing text Segment Entity Listing for the text Segment of FIG. 6H, in accordance with embodiments of the present disclosure.

FIG. 7A is a flow diagram of one of the components in FIG. 2, in accordance with embodiments of the present disclosure.

FIG. 7B is a diagram showing the alignment of entries in the Clusters and Segments Table of FIG. 6C with the entries of input AV Media Data for clipping of AV Media Data, in accordance with embodiments of the present disclosure.

FIG. 7C is a table showing a sample listing of Media Clips (MCs) and certain features and attributes associated with the Media Clips, in accordance with embodiments of the present disclosure.

FIG. 8A is a flow diagram of one of the components in FIG. 1, in accordance with embodiments of the present disclosure.

FIG. 8B is a diagram showing the combination of MCs from different MC Listing Tables to form an MC Aggregate Listing Table, in accordance with embodiments of the present disclosure.

FIG. 8C is a table showing show/event metadata, in accordance with embodiments of the present disclosure.

FIG. 8D is a table showing a sample listing of user attributes, in accordance with embodiments of the present disclosure.

FIG. 9 is a flow diagram of one of the components in FIG. 1, in accordance with embodiments of the present disclosure.

FIG. 10C is a flow diagram of MC Editor App software application, in accordance with embodiments of the present disclosure.

DETAILED DESCRIPTION

Figure 1:
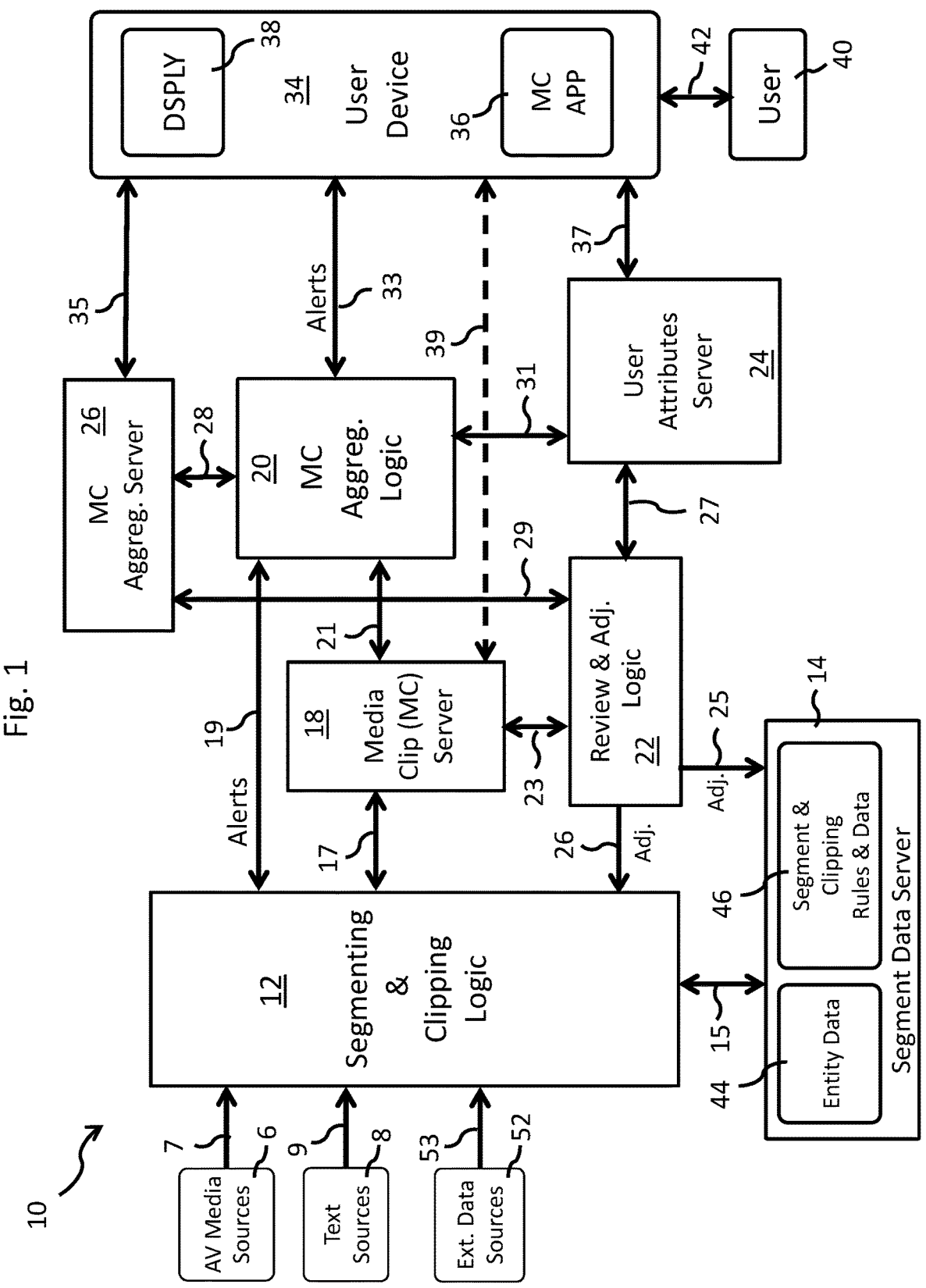
FIG. 1 is a top-level block diagram of components of a video/audio comprehension and automated clipping system, in accordance with embodiments of the present disclosure.

As discussed in more detail below, the present disclosure is directed to methods and systems for video/audio comprehension and automated clipping, which automatically comprehends and clips short video or audio media content (e.g., 2-3 minutes) from a longer (e.g., 30 min. or more) video or audio media event, such as a sports talk show or any other type of show, or a sporting event or any other type of event, which may be a live broadcast or pre-recorded, which may be collectively referred to herein as an event, and provide titles for each clip summarizing the topic discussed, as well as entity connection information (e.g., sports, leagues, teams, players, cities, and the like) discussed in the clip. The present disclosure may use a video file (having both video and audio data) or an audio-only file (having only audio data), such as an audio podcast or radio broadcast or show. The present disclosure also performs various reviews and error corrections to ensure proper topic and entity identification, such as phonetic correction and co-reference resolution (e.g., pronouns, nicknames, etc.).

Also, the present disclosure also provides a user interface which presents or displays the clips to the user in an easy-to-use graphical user interface (GUI) or user interface (UI), that allows the user to select and watch the clips of interest. Also, the media clips may be obtained from shows or events that may be pre-set or set by user preferences and delivered (or pushed) to the user device directly or the system may provide an alert to the user device indicating that the desired AV media clips are available for viewing.

The GUI may display one or more clips from a given event as scrollable and selectable thumbnail images or text with active web links, e.g., about fifteen 2-min clips or about ten 3-min clips for a 30 min show, or may provide one or more clips from different shows that meet certain user-specified or pre-determined criteria.

The GUI may also provides the user with the ability to view details about each clip, such as length of clip, date of clip, which entities are mentioned for what percentage of the clip, and the ability to view the clip. Users may also select and adjust how they view the clip in the GUI (e.g., the format of the display), the entities mentioned in the clip, and the minimum and maximum allowed time duration for each clip. The disclosure also provides the ability for users to set-up and receive alerts when clips are ready having certain user-selectable or pre-determined criteria. Feedback may also be provided, by users (the general public or video editors or system administrators or the like) or by the system itself, to adjust or re-tune the logic or rules that identifies entities or topics and that creates the clips.

The present disclosure also provides a technique for identifying entities in any text or transcript and providing a classification of the relative usage of the entities discussed in the transcript for each segment created as well as for the entire transcript. In that regard, the disclosure may receive only text and provide entity classification of the text as a whole, and may also provide text segments having titles and classifications for viewing or reading by a user.

Also, the present disclosure provides the user with an understanding of what a given video is about, which is much better than conventional approaches, especially for videos where discussions are far-ranging in topics and shift from one topic to another. For example, conventional video classification may use simple entity recognition, where if an entity is mentioned in the video, the video is about that entity, and an associated confidence score may be provided as well. Such a conventional approach can lead to poor results and diminished understanding of what the video is about when multiple topics or entities are discussed.

In addition, the present disclosure allows for feedback from general public users as well as editor/producer users, which can also adjust clip content, such as entity information, clip duration, and the like. The user feedback is used by machine learning logic of the present disclosure, which is trained by previous user feedback and adjustments, and is used to adjust entity information and clip duration (or other clip or segment parameters), and associated logic or algorithms, to influence future media clip creation.

FIG. 1 illustrates various components (or devices or logic) of a video/audio comprehension and automated clipping system 10 of the present disclosure, which includes Segmenting and Clipping Logic 12, which receives video or audio input data (collectively referred to herein as "AV media data" or "media data") from one or more audio or video sources 6 on a line 7. If the AV Media data is a video file, it may contain both audio and video data and may include separate audio and visual (or video) data channels. If the AV Media data is an audio file, such as an audio podcast or radio broadcast or radio show, it may contain only audio. Also, in some embodiments, there may be one or more text sources 8 on a line 9, which may be solely a text data file, such as an article or a digital transcript. The Segmenting and Clipping Logic 12 may also receive data input from external data sources 52 on a line 53, such as online Wiki data sources or the like for entity identification or other purposes, as discussed more herein. The Segmenting and Clipping Logic 12 analyzes (or comprehends) and extracts portions of (or "clips") the input AV Media data into short media files (or media clips) and saves them on a Media Clip (MC) Server 18, to build (or populate) a Media Clip listing table or database, such as that shown in FIG. 7C and discussed more hereinafter.

The Segmenting and Clipping Logic 12 communicates with a Segment Data Server 14 on a line 15, the Media Clip (MC) Server 18 on a line 17, and Media Clip Aggregation Logic 20 (e.g., for alerts or other information) on a line 19. Segment Data Server 14 may include data or databases or tables relating to Entity Data 44 and Segment & Clipping Rules & Data 46, which may be located within a single server or distributed among a plurality of servers. The Media Clip (MC) Server 18 communicates with the Media Clip (MC) Aggregation Logic 20 on a line 21 and with Review and Adjustment Logic 22 on a line 23. The Review and Adjustment Logic 22 communicates with the Segment Data Server 14 on a line 25, with the Segmenting & Clipping Logic 12 on a line 26, with a User Attributes Server 24 on a line 27, and with a Media Clip (MC) Aggregation Server 26. The Media Clip (MC) Aggregation Logic 20 also communicates with the User Attributes Server 24 on a line 31 and with the Media Clip (MC) Aggregation Server 26 on a line 28. The Review and Adjustment Logic 22 reviews content on the servers 18, 26 and user attributes data on the server 24 and adjusts the data in the Segment Data Server 14 accordingly, as discussed herein.

The servers 24,26 communicate with a user device 34, such as a smart phone or computer (discussed more hereinafter), on lines 35,37, respectively. The user device 34 may have Media Clips software application (MC App) 36 (discussed more hereinafter) loaded thereon and a display 38 and communicates with a user 40 (e.g., receives inputs and provides outputs), as shown by a line 42. Also, the Media Clip Aggregation Logic 20 may also communicate with the user device 34 (e.g., for alerts or other information) on a line 33, as discussed herein.

The User Attributes Server 24 may communicate directly with the user device 34 on the line 37 to receive information from the user device 34 regarding user attributes, preferences, settings and the like, as discussed hereinafter. Also, the user device 34 may communicate directly with the MC Aggregation Server 26 on the line 35 to receive the media clips or aggregated media clips for displaying and playing on the user device via the MC App 36. In some embodiments, the user device 34 may communicate directly with the MC Server 18 to receive media clips from a given event. The MC Aggregation Logic 20 retrieves media clips and data from the MC Server 18 and creates aggregated video/audio media clips and saves them on the MC Aggregation Server 26 for use by the user device 34.

The AV (audio/video) media sources 6 provide digital source media data for a given event (streamed live or pre-recorded), e.g., a sports show or sporting event (or other event that has topical segments that may be of interest to users), for comprehension and clip creation by the Segmenting and Clipping Logic 12 and, in some embodiments, for aggregation of media clips by the Media Clip Aggregation Logic 20, ultimately for viewing the media clips (or aggregated media clips) on the display 38 of the user device 34 by the user 40, or listening to them from the audio output or speakers of the user device, as discussed herein. The AV media sources 12 may include, for example, audio/video playback servers providing audio or video from one or more pre-recorded shows, or live or streaming audio or video from one or more video cameras, audio/visual players, production or master control centers/rooms, media routers and the like, and may have separate audio (sound only) and visual (images only) data channels.

The user device 34 may be a computer-based device, which may interact with the user 40. The user device 34 may be a smartphone, a tablet, a smart TV, a laptop, cable set-top box, or the like. The device 34 may also include the MC App 36 loaded thereon, for providing a desired graphic user interface or GUI or visualization (as described herein) for display on the user device 34. The MC App 36 runs on, and interacts with, a local operating system (not shown) running on the computer (or processor) within the user device 34, and may also receive inputs from the user 40, and may provide audio and video content to audio speakers/headphones (not shown) and the visual display 38 of the user device 34. The user 40 may interact with the user device 34 using the display 38 (or other input devices/accessories such as a keyboard, mouse, or the like) and may provide input data to the device 34 to control the operation of the MC App 36 software application running on the user device 34 (as discussed further herein).

The display 38 also interacts with the local operating system on the user device 34 and any hardware or software applications, video and audio drivers, interfaces, and the like, needed to view or listen to the desired media and display the appropriate graphic user interface (GUI) for the MC App, such as the MC playback or display, and to view or listen to a media clip or segment on the user device 34 or to adjust the adjust user attributes relating to the MC App or media clips.

The Segmenting and Clipping Logic 12 identifies text segments of audio portion (or audio channel) of the AV media data that have a common topic or common entities within the longer AV media input or event, and stores the corresponding AV media clips and associated details (e.g., entity names and usage statistics, timestamps, and the like) onto the Media Clip Server (MC Server) 18, as described further herein. The logic 12 also labels or tags each media clip with a topical title, and, in some embodiments, determines the sentiment (positive or negative), date, location, or other general information about the media clip, and stores the resulting details onto the Media Clip Server (MC Server) 18, as described further herein. The logic 12 may also provide alerts to Media Clip Aggregation Logic 20 when a set of media clips for a given event, or a group or collection of shows or events, have been completed.

The Media Clip (MC) Aggregation Logic 20 may also receive input or requests directly from the user (or a system administrator or the like) or may use information about the user 40 stored in the User Attributes Server 24 (or the user device 34 or otherwise) to update the Segmenting and Clipping Logic 12, and the Media Clip (MC) Aggregation Logic 20 may also provide alerts to the user device 34 (directly or otherwise) when a media clip or a plurality or series of media clips is ready for viewing based on user settings, predetermined settings, or predictive logic, as described further herein.

The MC App 36 running on the user device 34 provides a graphic user interface (GUI) which displays the media clips (or MCs) for one or more shows on the display 38 based on the information in the User Attributes Server 24 and the MC Aggregation Server 26 and based on inputs, preferences, and options settings from the user 40, as well as direct inputs or requests from the user 40, as described herein. The logic and processes of the system 10 described herein may comprehend the text from the audio portion of the input AV Media and clip (or extract a portion of) the AV Media data from a pre-recorded event or show, e.g., using pre-recorded AV media data input, or may comprehend and clip a game or event in realtime, e.g., using live AV media data (such as a live video stream, or video that is being played as if it were live), and provide the associated realtime media clip information. Also, the system 10 may comprehend and clip a single show, game or event or a plurality of different shows, games or events occurring at the same time, or simultaneously comprehend and clip some live shows, games or events and some pre-recorded shows, games or events. It may also analyze an entire season (or group of games or events) for a given sport or event type, or may comprehend and clip shows, games or events from multiple different sports or events. The user may select the types of shows, sports, games, or events, and the types of entities of interest, e.g., sports, leagues, teams, players, cities, and the like, for which the system 10 comprehends, clips, aggregates, and provides media clip (or MC) information or data, as discussed more hereinafter.

The Review and Adjustment Logic 22 receives inputs from the Segment Data Server 14, the Media Clip Server 18, the MC Aggregation Server 26, and the User Attributes Server 24, and adjusts the data in the Segment Data Server 14 and the User Attributes Server 24 to improve or optimize the performance of the Segmenting and Clipping Logic 12.

Figure 2:
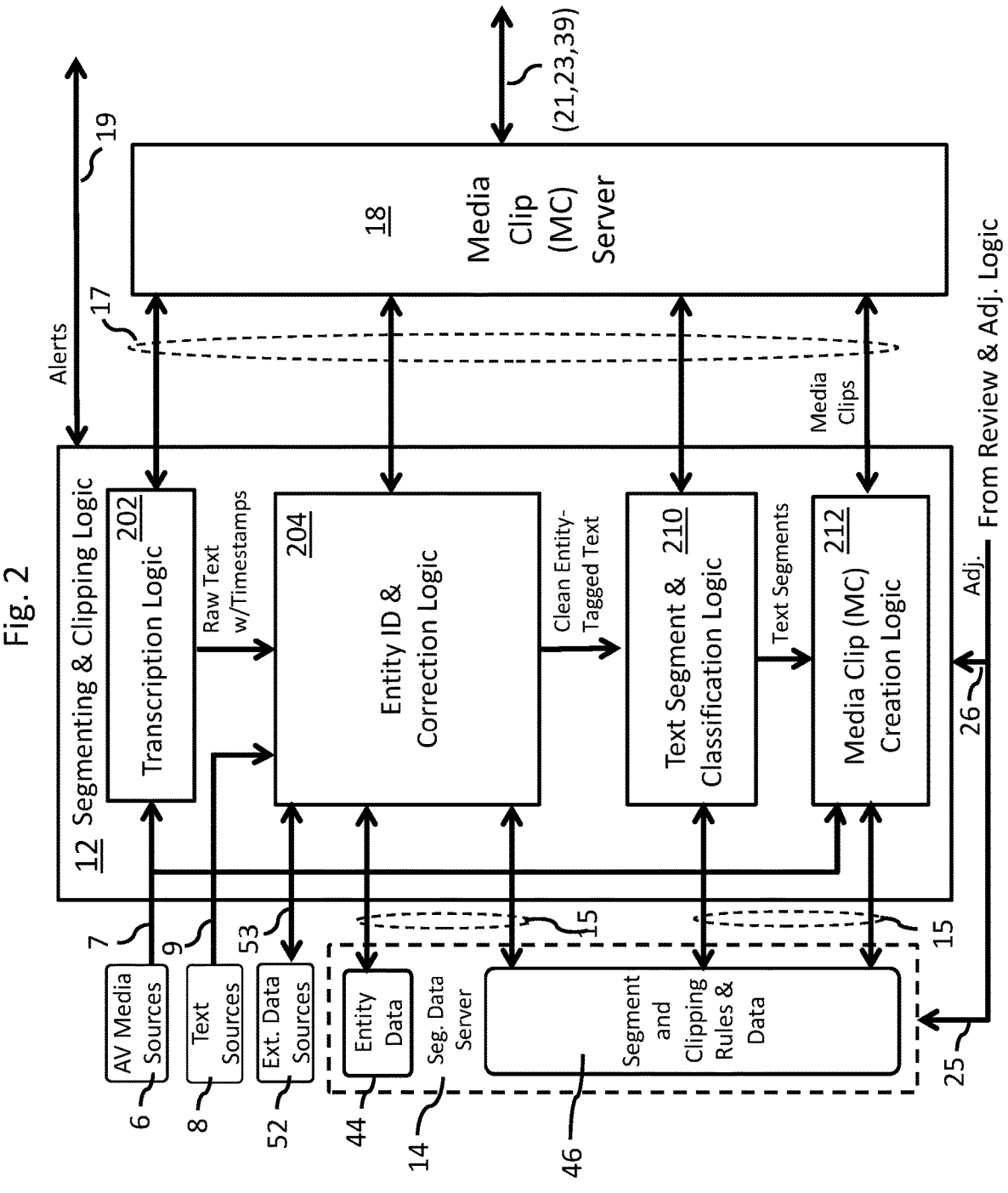
FIG. 2 is a more detailed block diagram of components of FIG. 1, in accordance with embodiments of the present disclosure.

Referring to FIG. 2, the Segmenting and Clipping Logic 12 may be viewed as having four components: Transcription Logic 202; Entity ID and Correction Logic 204; Text Segment and Classification Logic 210; and Media Clip (MC) Creation Logic 212. The line 17 (FIGS. 1, 2) showing communication between the Segmenting and Clipping Logic 12 and the Media Clip (MC) Server 18 is broken-down in FIG. 2 to show communication between the components 202, 204, 210, 212 and the Media Clip (MC) Server 18. Similarly, the line 15 (FIGS. 1, 2) showing communication between the Segmenting and Clipping Logic 12 and the Segment Data Server 14 is broken-down in FIG. 2 to show communication between the components 204, 210, 212 and the Segment Data Server 14.

The Transcription Logic 202 transcribes the audio portion (or audio data channel) of the AV Media input data into text having timestamps (at the word, sentence and paragraph level) corresponding to the audio portion of the AV Media input data, using a known open AI speech-to-text software program or tool, such as Whisper, an OpenAI product (see https://openai.com/research/whisper), and saves the resulting raw text with time stamps on the Media Clip Server 18. The timestamps are generated by speech to text software, which measures start/end of each word in relation to the start of the video. For example, the speech-to-text software starts with a timestamp of 00:00:00 at the beginning of the text transcript (beginning of video) and determines a timestamp for each word in the transcript. Other speech-to-text software may be used, provided it provides the desired function and performance described herein, such as known speech-to-text transcription software program "Transcribe" by Amazon (see: https://aws.amazon.com/transcribe/) and "Speech to Text" by Google (see: https://cloud.google.com/speech-to-text/) or any other speech-to-text tool.

The Entity ID & Correction Logic 204 uses known entity recognition software (or service), such as Azure Cognitive Services by Microsoft (see, https://learn.microsoft.com/en-us/azure/cognitive-services/language-service/named-entity-recognition/overview) or Natural Language by Google (see: https://cloud.google.com/natural-language) or Comprehend by Amazon (see: https://aws.amazon.com/comprehend/). Such entity recognition software services may include known machine learning or artificial intelligence (AI), and analyzes the raw text transcription with timestamps, and uses data libraries, such as the Entity Data 44 or External Data Sources 52, such as entity data from WikiData, or entity libraries provided by medium.com (see: Libraries: https://medium.com/quantrium-tech/top-3-packages-for-named-entity-recognition-e9e14f6f0a2a)) to identify various entities (or topics) in the text and store the resulting clean entity-tagged text with time stamps on the Media Clip Server 18, discussed more hereinafter. An example of an entity table showing layers of entities or connections or relationships for entities is shown in FIG. 5C, discussed hereinafter. Other data libraries may be used if desired.

The Entity ID & Correction Logic 204 also analyzes the initial entity-tagged text and, identifies and corrects phonetic errors (e.g., payton and peyton) and also performs co-reference resolution, such as resolving pronoun usage (e.g., he, him, his, she, her, hers, and the like), known entity information, such as nicknames and the like (e.g., Brady, Tom, TB12 for Tom Brady or UConn for University of Connecticut), relationship mapping (e.g., husband, wife, cousin, son, and the like), and the like, using the Segment & Clipping Rules & Data 46, or other sources, and inserts the entity name into the text and stores the resulting clean (or corrected or resolved) entity-tagged text with timestamps on the Media Clip Server 18, discussed more hereinafter. In some embodiments, instead of replacing the entity for the co-referenced terms in the text, they may just be associated and counted or tagged as entities for purposes of determining whether the Cluster rules or Segment rules have been satisfied.

The Text Segment and Classification Logic 210 analyzes the corrected (or clean or resolved) entity-tagged text, to group same entities mentioned within a predetermined time period and also determine the begin (or start) and end (or stop) times of topics of discussion (or entities). The Logic 210 also identifies a descriptive title or label for each text segment, and stores the resulting titled text segments with entity tags and timestamps on the Media Clip Server 18. The Media Clip Creation Logic 212 analyzes the titled text segments with begin and end timestamps and extracts (or clips) the portion of the source audio/video input data with corresponding video timestamps as individual audio/video clips for consumption by the user and stores the individual titled audio/video clips (or Media Clips or MCs) on the Media Clip Server 18.

Referring to FIG. 3, a flow diagram 300 illustrates one embodiment of a process or logic for providing, the Segmenting & Clipping Logic 18 (FIGS. 1,2), for segmenting the transcript text by topics and clipping corresponding video from the AV media source. The process 300 starts at a block 302 which determines whether the input is text only. If NO, then the input is audio/video and the logic proceeds to block 304 which performs the Transcription Logic 202 to perform speech-to-text transcription on the AV Media data and saves the resulting text transcript as Raw Text in the MC Server 18. Next, or if the result of block 302 was YES, block 306 performs Entity ID & Correction Logic 204 (FIG. 2) on the Raw Text transcript to detect entities (and assign connections to teams, leagues, country, and the like) and discard or ignore infrequently occurring entities, and saves the results as Clean Entity-Tagged Text in the MC Server 18. Next, block 310 performs Text Segment & Classification Logic 210 (FIG. 2) on the Clean Entity-Tagged Text and saves the results as Text Segments with timestamps in the MC Server 18.

Next, block 312 determines if the original input data was text only. If not, the input was AV Media data and block 314 performs the Media Clip (MC) Creation Logic 212 (FIG. 2) on the Text Segments with timestamps and saves the resulting Media Clips (or MCs) in the MC Server 18. Next, or if the result of block 312 is YES, block 316 determines if there are any other media shows/events to comprehend and clip. If NO, the logic exits. If YES, the logic proceeds back to block 302 and repeats the process for the next event.

Referring to FIG. 4, a flow diagram 400 illustrates one embodiment of a process or logic for providing the Transcription Logic 202 (FIG. 2), for converting the audio portion of the input AV media data into a transcript text. The process 400 starts at a block 402 which retrieves the audio portion of the AV Media input data for a given event. Next, block 404 performs speech-to-text transcription of the audio portion of the AV Media data and inserts timestamps by measuring the beginning and end of each word in relation to the start of the video using, e.g., an open AI tool, such as an AI speech-to-text software program or tool, such as Whisper, an Open AI product (see https://openai.com/research/whisper). Other speech-to-text transcription software may be used provided it provides the desired function and performance discussed herein. In some embodiments, speaker detection and computer vision may be used to enhance transcript results with speaker information. Next, in some embodiments, block 406 performs standard error checking and correction on the output text transcript to correct transcription errors, e.g., typographical errors and the like, which may be done using generative pre-trained transformer (GPT) or a similar autoregressive language model. Next, block 408 saves the error-corrected transcript output text as Raw Text on the MC Server 18.

Figure 5A:
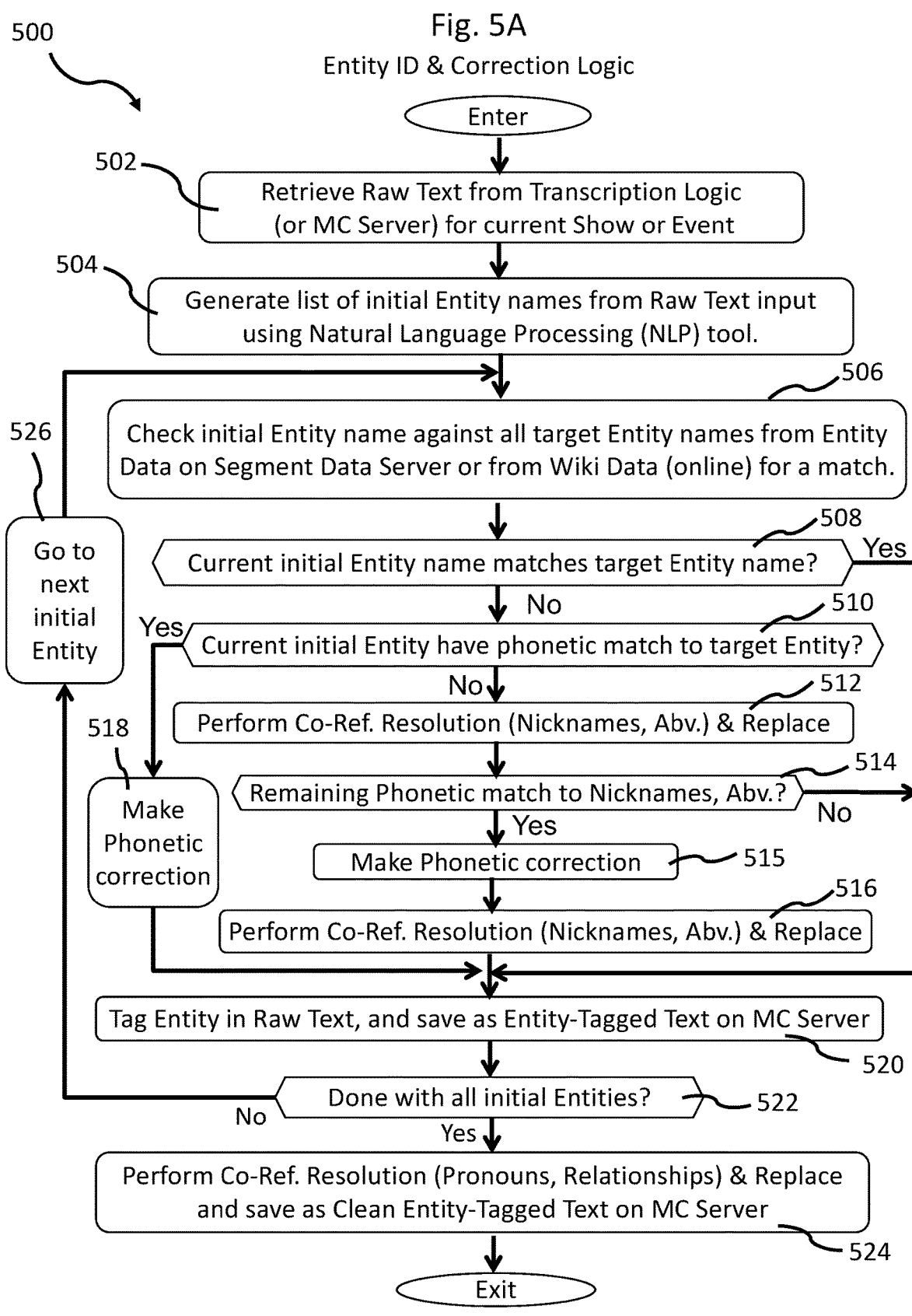
FIG. 5A is a flow diagram of one of the components in FIG. 2, in accordance with embodiments of the present disclosure.

Referring to FIG. 5A, a flow diagram 500 illustrates one embodiment of a process or logic for providing, the Entity ID & Correction Logic 204 (FIG. 2), which analyzes the raw text transcript with timestamps, and uses the Entity Data 44 and Segment & Clipping Rules & Data 46 to identify various entities (or topics). The process 500 starts at a block 502 which retrieves the Raw Text with timestamps for a given event from the Transcription Logic 202 or the MC Server 18. Next, block 504 generates a list of initial Entity names from the Raw Text using the previously mentioned Natural Language Processing (NLP) tool.

Next, block 506 retrieves the first initial Entity name and checks the initial Entity name against all target or reference Entity names from the Entity Data on Segment Data Server or from an external source or library, such as Wiki Data (online) for a match, as discussed herein.

In some embodiments, the target or reference Entity Data may be stored in a table or database, such as the Entities Data Table 580 shown in FIG. 5C, which shows the different levels or connections or relationships of Entities, such as Sport, League, Conference, Team, Player, and Other. Other parameters or names or levels for the Entities may be used if desired. Others or Other Entities may also include nicknames for a given player, team, league, city or the like, and may also include names of other people, animals, or things, such as referee name, mascot name, horse name, car name, or the like or any other person or object that may have an identifiable name or label that may be a topic of interest in an event or show.

Next, block 508 determines if the current initial Entity name matches any target Entity name. If Yes, the logic proceeds to block 520, discussed hereinafter. If NO, block 510 determines if the current initial Entity has a phonetic match to any target Entity, using a software tool, such as talisman NLP library, see https://yomguithereal.github.io/talisman/. and the phonetic rules from the Segment & Clipping Rules & Data 46, which may be stored in a table or database such as the Segment & Clipping Rules/Data Table 590 of FIG. 5D. In particular, the phonetic rules shown in the Segment & Clipping Rules/Data Table 590 (FIG. 5D) determine the minimum possible phonetic partial match (Min. Possible Phonetic Partial Match) required to be considered a phonetic match (or phonetically similar), e.g., 3 letters. Other values for this parameter may be used by the system if desired and the value may be changed by the system of the present disclosure, e.g., by the Review and Adjustment Logic 22 (FIG. 1), or by an administrator or editor or general user 40 of the system 10. Also, other or additional rules, criteria, or requirements for determining phonetic similarity or a phonetic match (which may be referred to generally herein as phonetic rules) may be used if desired. If the result of block 510 is Yes, block 518 makes the phonetic correction and the logic proceeds to block 520, discussed hereinafter. In particular, in some embodiments, block 518 may update the Entity-Tagged Text with the phonetic corrections to the Entity name in the transcript and save on the MC Server.

If the result of block 510 is NO, block 512 performs co-reference resolution for nicknames, abbreviations, and the like and replaces the nicknames, abbreviations, and the like with the target or reference Entity name. The co-reference resolution logic may use a software tool by AllenLP.org, using a coreference library, such as https://demo.allenlp.org/coreference-resolution, and may use co-reference rules from the Segment & Clipping Rules & Data 46, to replace nicknames, abbreviations, and the like, with the Entity name in the transcript, the rules or data may be stored in a table or database such as the Segment & Clipping Rules/Data Table 590 of FIG. 5D. In particular, the co-reference rules shown in the Segment & Clipping Rules/Data Table 590 (FIG. 5D) determine the maximum number of words that the co-reference resolution will check away from the Entity, or Co-Reference Offset Maximum, e.g., 5 sentences. Other values for this parameter may be used by the system if desired and the value may be changed by the system of the present disclosure, e.g., by the Review and Adjustment Logic 22 (FIG. 1), or by an administrator or editor or general user 40 of the system 10. Also, other or additional rules, criteria, or requirements for performing co-reference resolution (which may be referred to generally herein as co-reference resolution rules) may be used if desired.

Next, block 514 determines if any of the remaining initial Entities has a phonetic match to any nicknames, abbreviations or the like using the phonetic tool and phonetic rules similar to that discussed with block 510 above. If the result of block 514 is NO, there are no phonetic similar matches and the logic proceeds to block 520, discussed hereinafter. If the result of block 514 is Yes, there is a phonetic similar match and block 515 makes the phonetic correction.

Next, block 516 performs co-reference resolution for the corrected nicknames, abbreviations, and the like and replaces the corrected nicknames, abbreviations, and the like with the target or reference Entity name. The co-reference resolution logic and rules may be similar to that discussed with block 512. Next, block 520 tags the current Entity in the Raw Text and may also assign connections for (or link) the current Entity to teams, leagues, country of origin, and the like (FIG. 5C), and saves as Entity-Tagged Text (and its connections) on MC Server. Such entity connections may be used for classification and roll-up purposes, discussed herein.

Next, block 522 determines if all the initial Entities have been checked. If NO, block 526 goes to the next initial Entity and the logic returns to block 506. If the result of block 510 is YES, all initial Entities have been assessed for potential identical matches, phonetically similar matches, co-reference matches, and phonetic co-reference matches, against the target or reference Entities list. Next, block 524 performs co-reference resolution on the transcript text for pronouns, relationship terms, and the like (as discussed herein above) and replaces (or accounts for or tags) same with the target Entities and saves the results as Clean Entity-Tagged Text on MC Server and the logic exits. The co-reference resolution logic and rules for block 524 may be similar to that discussed with block 512 above.

In particular, the co-reference rules shown in the Segment & Clipping Rules/Data Table 590 (FIG. 5D) determine the maximum number of words that the co-reference resolution will check away from the Entity, or Co-Reference Offset Maximum, e.g., 5 words. Other values for this parameter may be used by the system if desired and the value may be changed by the system of the present disclosure, e.g., by the Review and Adjustment Logic 22 (FIG. 1), or by an administrator or editor or general user 40 of the system 10. Also, other or additional rules, criteria, or requirements for determining phonetic similarity or a phonetic match (which may be referred to generally herein as phonetic rules) may be used if desired.

Next, block 564 updates the Phonetic-Tagged Text with co-reference updates and saves the updated text on the MC Server as Clean Entity-Tagged Text. Next, block 566 determines whether all the entities have been reviewed for co-reference resolution. If NO, block 568 goes to the next Entity and the logic proceeds back to block 562 to repeat with the next Entity. If the result of block 566 is YES, all the Entities have been checked, and the logic exits. The group of blocks 562-566 may be referred to herein as phonetic correction logic 572.

Figure 5B:
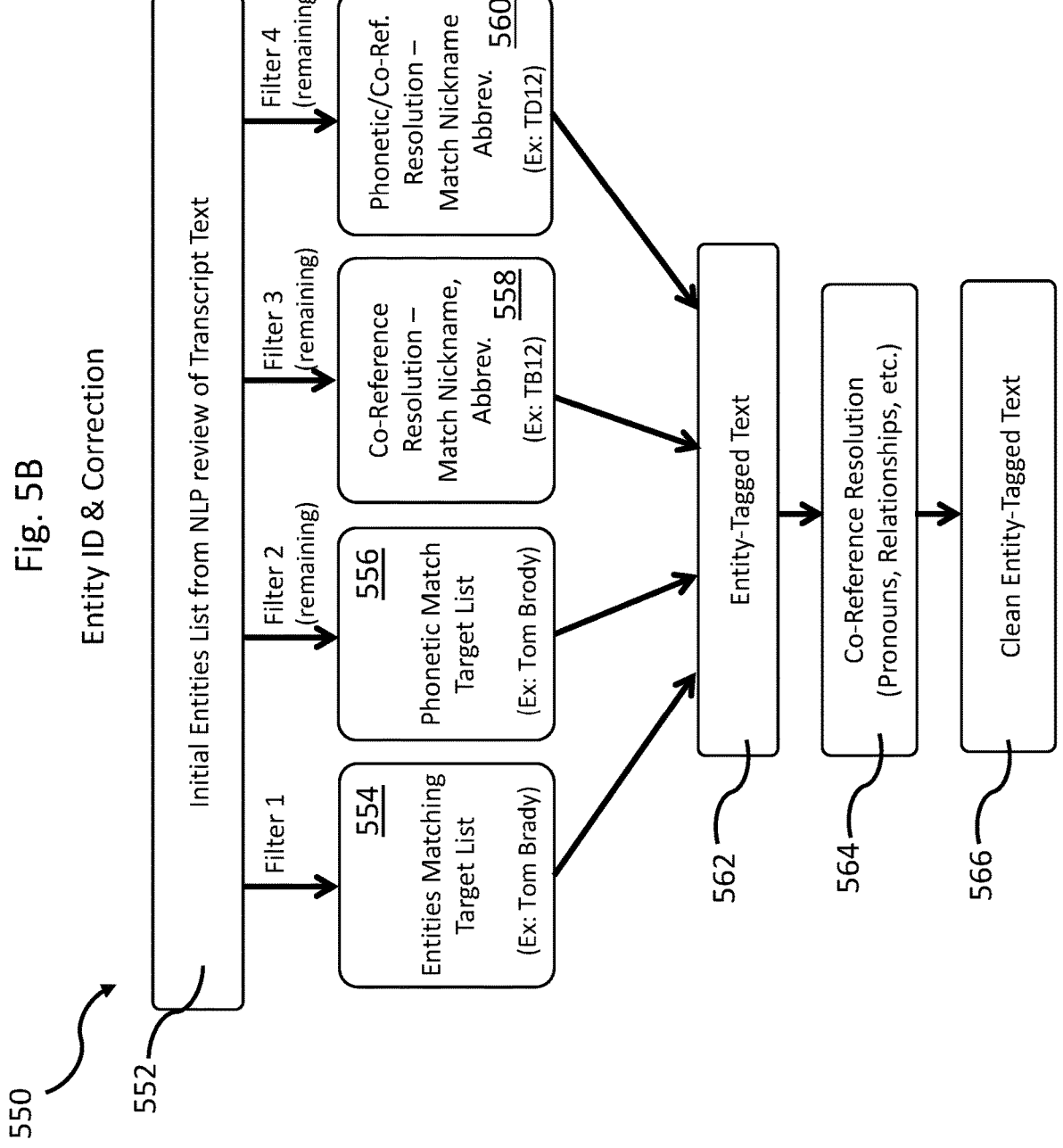
FIG. 5B is a diagram of one of the components in FIG. 2, in accordance with embodiments of the present disclosure.

Referring to FIG. 5B, a top-level data flow diagram 550 is shown for the Entity ID & Correction Logic. In particular, initial Entities from NLP review of the transcript text data 552 may be filtered (or reviewed or analyzed) in various ways to determine correct matches to a target or reference Entities table (or library or listing or database) 580 (FIG. 5C) to provide accurate entity identification in the transcript text, which provides accurate text segmenting and classification, discussed hereinafter. For example, the initial Entity data may be reviewed using a first filter process or logic (Filter 1), which reviews the initial Entities for exact matches in the desired target Entities list (e.g., "Tom Brady"), with the results shown as block 554. Next, the initial Entities remaining after Filter 1 are reviewed using a second filter process or logic (Filter 2) to determine if there is a phonetically similar match to the desired target Entities list (e.g., "Tom Brody" is phonetically similar to the target entity "Tom Brady"), using phonetic rules, as discussed herein, with the results shown as block 556. Next, the initial Entities remaining after Filter 2 are reviewed using a third filter process or logic (Filter 3) which performs co-reference resolution to determine if there are any matches for nicknames or abbreviations or the like (e.g., "TB12" nickname for "Tom Brady"), using co-reference resolution rules, as discussed herein, with the results shown as block 558. Next, the initial Entities remaining after Filter 3 are reviewed using a fourth filter process or logic (Filter 4), which performs co-reference resolution with phonetically similar terms to determine if there are any matches for phonetically similar nicknames or abbreviations or the like (e.g., "TD12" phonetically similar to the nickname "TB12"), using phonetic rules, as discussed herein, with the results shown as block 560. Next, the results from each of the filters may be shown as the Entity-Tagged Text 562. Next, co-reference resolution is performed, shown as block 564, on the Entity-Tagged Text to replace (or account for or tags) pronouns, relationship words, and the like, in the transcript text with the associated Entity name using co-reference resolution rules, as discussed herein, with the results shown as Clean Entity-Tagged Text 566. Once the entities are identified (at block 562 or 566) the entity is also assigned to a team, league, country of origin, and the like (FIG. 5C), which may be used for raw detected classification and rolled-up classification purposes, as discussed hereinafter with FIG. 6J.

Referring to FIG. 6A, a flow diagram 600 illustrates one embodiment of a process or logic for providing the Text Segment & Classification Logic 210 (FIG. 2), which groups the Entities mentioned in the transcript into Segments (or text passages) having a begin (or start) time and an end (or stop) time and also generates a brief descriptive title or label for the Segment text. The Entities selected for inclusion in the Segment are indicative of topics of discussion in the Segment text. The process 600 starts at a block 652, which retrieves the Clean Entity-Tagged Text with timestamps for a given event from the Entity ID & Correction Logic 204 (FIG. 2) or from the MC Server 18. Next, block 604 retrieves the first Entity from the Clean Entity-Tagged Text. Next, block 606 creates text Clusters each having a begin time and an end time for the current Entity across the entire text transcript based on Cluster rules from the Segment & Clipping Rules & Data 46, which may be stored in a table or database such as the Segment & Clipping Rules/Data Table 590 of FIG. 5D.

In particular, the Cluster rules shown in the Segment & Clipping Rules/Data Table 590 (FIG. 5D) determine the criteria for creating a Cluster. More specifically, for an Entity to meet the criteria for a Cluster, it must meet the minimum mention count, e.g., 2 mentions, over a maximum entity gap length, e.g., 60 seconds. In addition, any given Cluster must be at least a minimum time length, e.g., 90 seconds. Other values for these parameters may be used by the system if desired and the value may be changed by the system of the present disclosure, e.g., by the Review and Adjustment Logic 22 (FIG. 1), or by an administrator or editor or general user 40 of the system 10. Also, other or additional rules, criteria, or requirements for creating a text Cluster (which may be referred to generally herein as Cluster rules or Cluster Creation Rules) may be used if desired.

Next, at block 608, the Entities and Entity % of video time for the text Cluster are saved on the MC Server 18. Next, block 610 determines whether all the entities have been reviewed for Cluster creation. If NO, block 612 goes to the next Entity and the logic proceeds back to block 606 to create Clusters from the Clean Entity-Tagged transcript text with the next Entity. If the result of block 610 is YES, all the Entities have been reviewed and all Clusters have been created for each qualifying Entity in the transcript text.

Next, block 614 creates text Segments, each Segment having a begin time and an end time, by grouping (or merging) the text Clusters based on Segment rules (or Cluster Creation Rules) from the Segment & Clipping Rules & Data 46, which may be stored in a table or database such as the Segment & Clipping Rules/Data Table 590 of FIG. 5D. In particular, the Segment rules shown in the Segment & Clipping Rules/Data Table 590 (FIG. 5D) determine the criteria for creating a Segment. More specifically, the Segment must not be longer than the maximum Segment length, e.g., 5 min. Other values may be used if desired, and the value may be changed based on feedback from users or other reasons.

Thus, for a text Cluster to be included in a text Segment, it should not cause the Segment to be longer than the max. allowed Segment length. If it does, the text Cluster at issue may be "removed" from the text Segment (for the purposes of defining Segment begin or end time) and another Cluster in the Segment will determine the end time of the Segment. In that case, some of the content from the Cluster may remain in the Segment. Alternatively, in some embodiments, the Cluster at issue may be retained in the Segment and truncated when the Segment reaches the Max. In some embodiments, the entire segment may be excluded if it exceeds the maximum segment length, as indicated by a Yes in table 590 (FIG. 5D). In some embodiments, a Cluster Time Adjustment Time (or pad) may be provided with a value to allow for a cluster or segment to be adjusted by a predetermined amount of time, e.g., +/−20 seconds. In some situations, adding just a few seconds to the text Cluster can allow the text to complete a thought or topic, which may provide a higher quality MC for the user. In some embodiments, the Segment or Cluster exclusion may only apply to the MCs for viewing or listening by a user, and do not apply for purposes of entity classification and entity rollup discussed herein.

It should be understood by those skilled in the art that because the text Clusters are determined individually by Entity, certain Clusters may overlap in time. For example, if the host of a show discusses or compares Player A and Player B during a given time period, the Player A Cluster and Player B Cluster will likely at least partially overlap. For example, if the text says: "Player A is much better than Player B for many reasons. Player A throws farther and runs faster than Player B. Also, Player A is a better overall athlete." In that case, the Player A Cluster and Player B Cluster begin at the same time, and the Player B Cluster ends one sentence before the Player A Cluster.

Next, at block 616, the Entities and Entity % of video time and Roll-up for the text Segment are saved on the MC Server 18 as raw detected and rolled-up classifications. In particular, the results of the classification include both direct entity results (or Raw Detected Classification) and relational entity results (or "Rolled-Up Classification), such as that shown in FIG. 6J. For example, say Tom Brady is discussed for 25% of the video, and it is known by the Entities Data Table 580 (FIG. 5C) that Tom Brady is a member of the Tampa Bay Buccaneers, and the Tampa Bay Buccaneers is a team in the NFL. In that case, the media clip (MC) is 25% about Tom Brady, Tampa Bay, and the NFL. If the same video also discusses Patrick Mahomes for 25% of the time, the results would shift to 25% Tom Brady, Patrick Mahomes, Tampa Bay, and Kansas City, and 50% about the NFL.

Next, block 618 provides (or generates or creates) a brief descriptive title or label for the text Segment using a Generative AI Tool, e.g., GPT3 Model, or any other text labeling software program or tool, with the text Segment and with a prompt for a summary in headline format, and saves the Title on the MC Server 18, and then the logic exits.

Figure 6B:
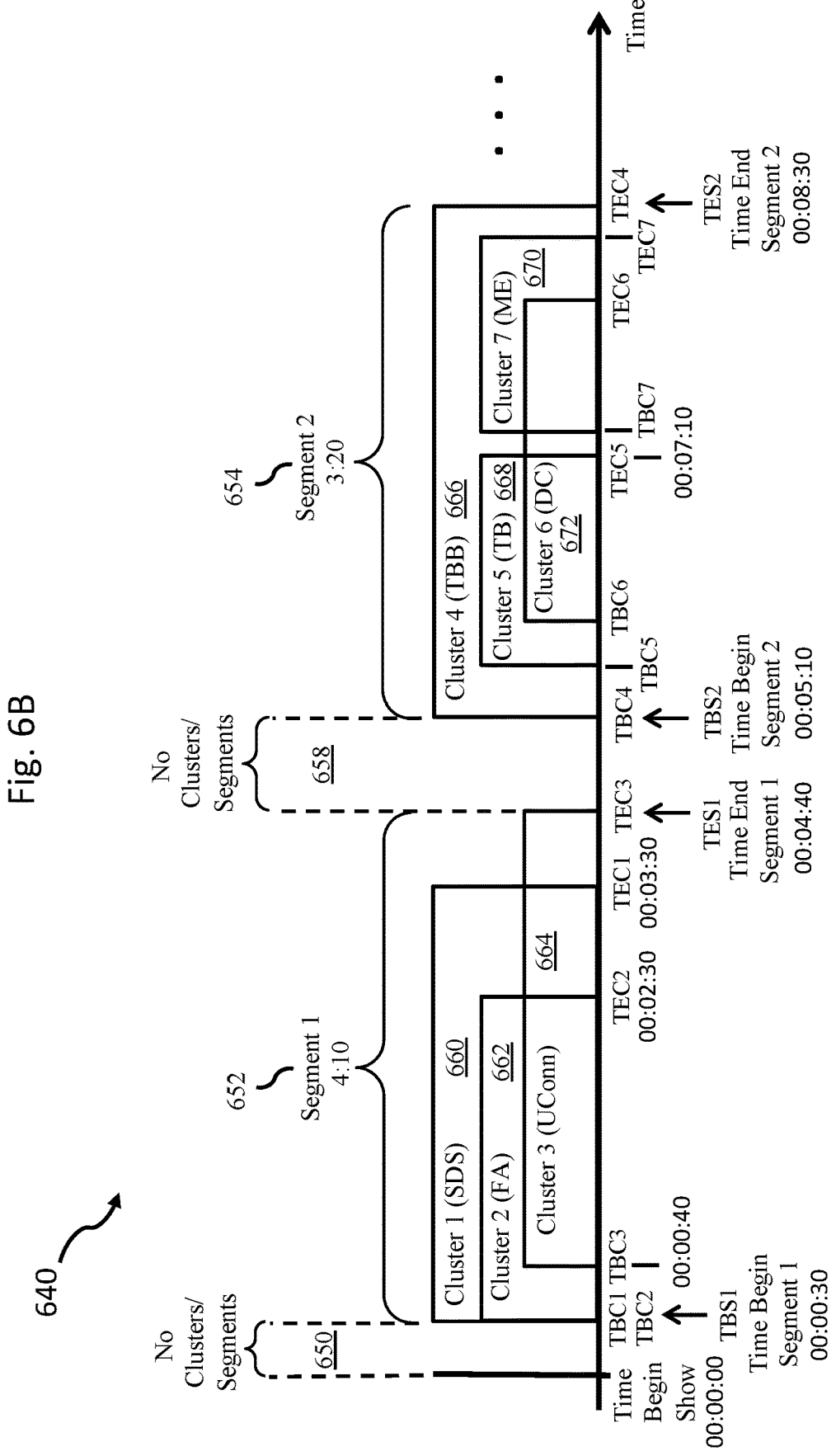
FIG. 6B is a timeline diagram showing how text clusters and text segments are created from transcript text, in accordance with embodiments of the present disclosure.

Referring to FIGS. 6B-6K, an example of how the Text Segment & Classification Logic 210 (FIG. 2) may be performed for a given text transcript is shown. Referring to FIG. 6B, a timeline diagram 640 shows how text Clusters and text Segments are created from the transcript text having embedded timestamps, in accordance with embodiments of the present disclosure. In particular, entity Clusters are created for Entities that meet the Entity Cluster creation criteria or rules, such as minimum Entity gap length (i.e., how long between mentions do we consider to be the same cluster), minimum Cluster length (i.e., the shortest time length a Cluster can be, e.g., 90 sec.) and minimum mention count (i.e., the minimum number of times an Entity must be mentioned to be considered a Cluster, e.g., two), as shown in FIG. 5D, and discussed herein above.

Referring to FIGS. 6B and 6C, an example of a timing diagram 640 for two sample segments (Segment 1 and Segment 2) is shown. In FIG. 6B, from left to right, the text transcript begins at the Time Begin Show and there are no Clusters or Segments during an initial time period 650 until the beginning of the Segment1, at time TBS1 (Time Begin Segment1), where Cluster1 (660) and Cluster2 (662) both begin at TBC1 (Time Begin Cluster1) and TBC2 (Time Begin Cluster2). Then, Cluster3 (664) begins at TBC3 (Time Begin Cluster3). Then, Cluster2 (662) ends at TEC2 (Time End Cluster2). Then, Cluster1 (660) ends at TEC1 (Time End Cluster1). Then, Cluster3 (664) ends at TEC3 (Time End Cluster3), which defines the end of Segment1 at TES1 (Time End Segment1). In this case, Cluster1, Cluster2 and Cluster3 all overlap during a period of time (between TBC3 and TEC2). Also, two of the Clusters overlap between TBC1 and TBC3 and between TEC2 and TEC1.

Similarly, for Segment2, there are no Clusters or Segments after the end of Segment1 during a time period 658 (e.g., 30 seconds) until the beginning of Segment2 at time TBS2 (Time Begin Segment2), where Cluster4 (666) begins at time TBC4 (Time Begin Cluster4). Then, Cluster5 (668) begins at time TBC5 (Time Begin Cluster5). Then, Cluster6 (672) begins at time TBC6 (Time Begin Cluster6). Then, Cluster5 (668) ends at TEC5 (Time End Cluster5). Then, Cluster7 (670) begins at TBC7 (Time Begin Cluster7). Then, Cluster6 (672) ends at TEC6 (Time End Cluster6). Then, Cluster7 (670) ends at TEC7 (Time End Cluster7). Then, Cluster4 (666) ends at TEC4 (Time End Cluster4), which defines the end of Segment2 at TES2 (Time End Segment2).

Referring to FIG. 6C, a Text Cluster & Segment Table 675 shows an example of data that may be stored by the system of the present disclosure for Clusters and Segments, for at least a portion of the example shown in FIG. 6B. In particular, Cluster1 is shown in rows 676 showing begin and end times of the Cluster1 (TBC1,TEC1), Cluster2 is shown in rows 678 showing begin and end times of the Cluster2

(TBC2, TEC2), Cluster 3 is shown in rows 680 showing begin and end times of the Cluster3 (TBC3, TEC3), and that Segment1 includes Cluster1, Cluster2 and Cluster3. Also, Cluster4 is shown in rows 682 showing begin and end times of the Cluster4 (TBC4,TEC4).

Referring to FIG. 6D, an example is shown of a text portion (or passage) 684 of a full transcript text of an event called "Sports News", which is a 30-minute sports show that discusses various current topics in the world of sports. In particular, example text portion 684 shows the beginning 685 of the show's transcript (Time Begin Show). It also shows each of the Entities found from the Entity ID Logic, which Entities are shown as underlined in the text. It also shows various pronouns underlined, e.g., "they", which is before co-reference resolution for pronouns has been performed. After co-reference resolution for pronouns has been performed on the text, the pronouns would be replaced by (or accounted or tagged for) the appropriate entity. For example, in the fourth line, the sentence portion "I look at Connecticut and they win these games . . . ", may be changed to say "I look at Connecticut and Connecticut win these games . . . ", or the word "they" may be tagged with metadata indicating it is associated with the entity, or a separate accounting of usage for the entity may be updated, which show two occurrences of Connecticut (which is also equated to Univ. of Connecticut and UCONN, as nicknames or equivalents for the same entity). Any other technique for associating or tagging the pronouns and nicknames and the like as being the same entity may be used if desired. It also shows the beginning of Segment1 (TBS1), and the end of Segment1 (TES1). It also shows that 12 Entities were identified in this passage 684 (from Begin Show to End of Segment1): LSU, Iowa, Giannis, Joel Embiid, Tiger, SD State, Fla. Atlantic, Uconn, Miami, Creighton, Providence, NC State. The first Entity to meet the Cluster rules (or criteria) of FIG. 5D was San Diego State (or SD State or SDS), followed by Florida Atlantic (or Fla. Atlantic or FA) and Uconn (or University of Connecticut), as they each met the Cluster rule or requirement of at least two (2) mentions in 60 seconds. The Entities LSU, Iowa, Giannis, Joel Embiid, Tiger did not meet the requirement of at least two (2) mentions in 60 seconds, which is illustrated by the region 650 of No Clusters/Segments in the example of FIG. 6CB. In addition, the Entities Creighton, Providence, NC State also did not meet the requirement of at least two (2) mentions in 60 seconds, and thus were not used for Clusters in the Segment1. Accordingly, only San Diego State (or SD State or SDS), followed by Fla. Atlantic and Uconn met the cluster rules and, thus, were used for Cluster1, Cluster2, Cluster3, respectively (discussed herein).

Referring to FIG. 6E, a Cluster1 text passage 686 within the text transcript passage 684 is shown, which shows Cluster1 for San Diego State, beginning at TBC1 (timestamp 12:34:30) and ending at TEC1 (timestamp 12:37:30), Cluster1 being 3 min long. For a 30 minute show, the SDS Cluster1 represents 3 min of the 30 min show or 10% of the total show video (or audio).

Referring to FIG. 6F, a Cluster2 text passage 688 within the text transcript passage 684 is shown, which shows Cluster2 for Florida Atlantic (or FA), beginning at TBC2 (timestamp 12:34:30) and ending at TEC2 (timestamp 12:36:30), Cluster2 being 2 min long. For a 30 minute show, the FA Cluster2 represents 2 min of the 30 min show or about 6% of the total show video (or audio).

Referring to FIG. 6G, a Cluster3 text passage 690 within the text transcript passage 684 is shown, which shows Cluster3 for Uconn, beginning at TBC3 (timestamp 12:34:

40) and ending at TEC3 (timestamp 12:38:40), Cluster3 being 4 min long. For a 30 minute show, the FA Cluster2 represents 4 min of the 30 min show or about 13% of the total show video (or audio).

Referring to FIG. 6H, a Segment1 text passage 692 within the text transcript passage 684 is shown, which shows Segment1 beginning at TBS1 (timestamp 12:34:40) and ending at TES1 (timestamp 12:38:40), Segment1 being 4 min long. For a 30 minute show, the FA Cluster2 represents 4 min of the 30 min show or about 13% of the total show video (or audio).

Referring to FIG. 6I, a Segment Entity Listing Table 693 is shown, which shows all the Entities found in Segment1, their order of appearance, and the Entities that met the Cluster and Segment rules.

Figure 6J:
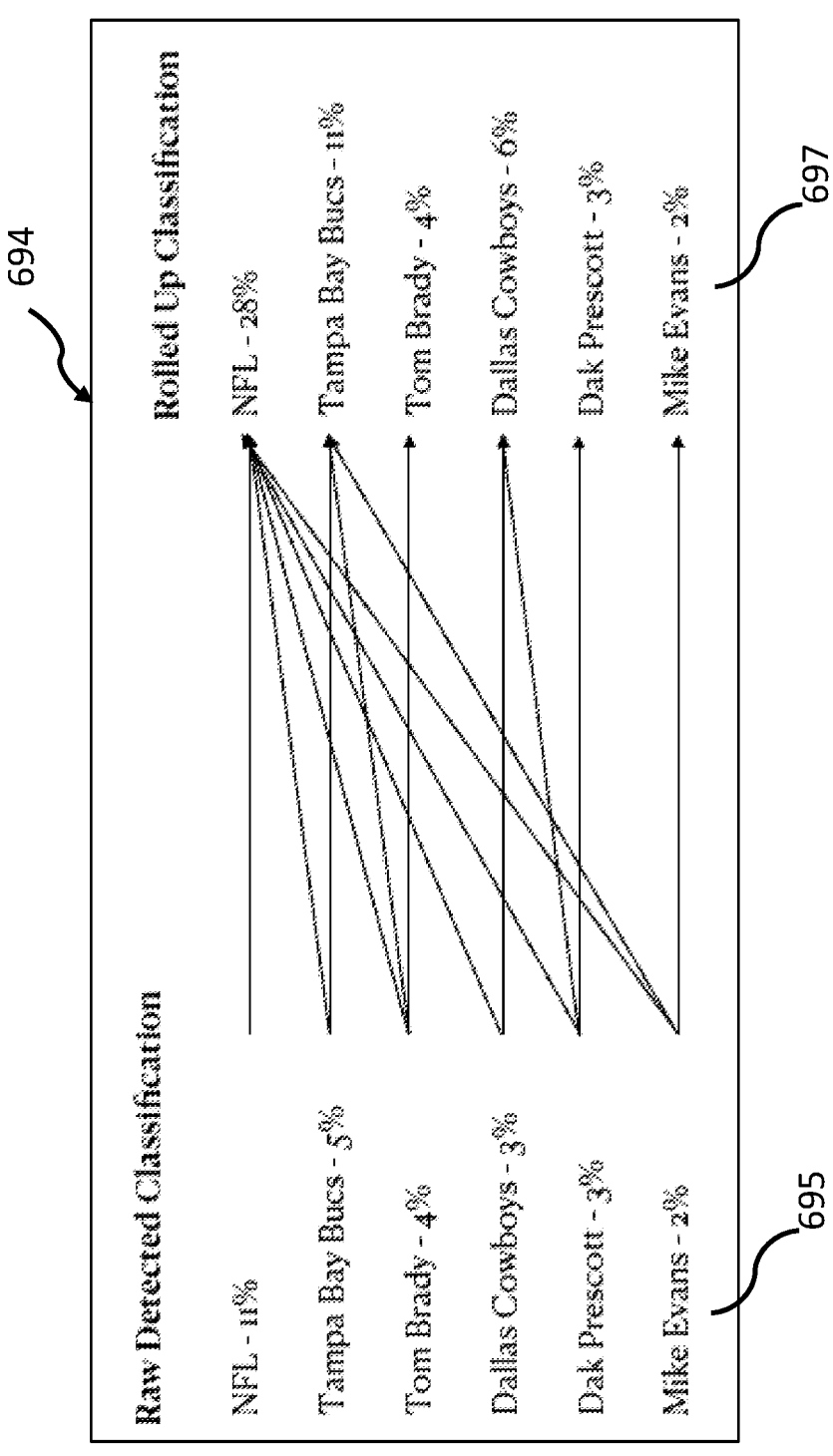
FIG. 6J is a diagram showing raw detected Entity classification and rolled-up Entity classification, in accordance with embodiments of the present disclosure.
Figure 6K:
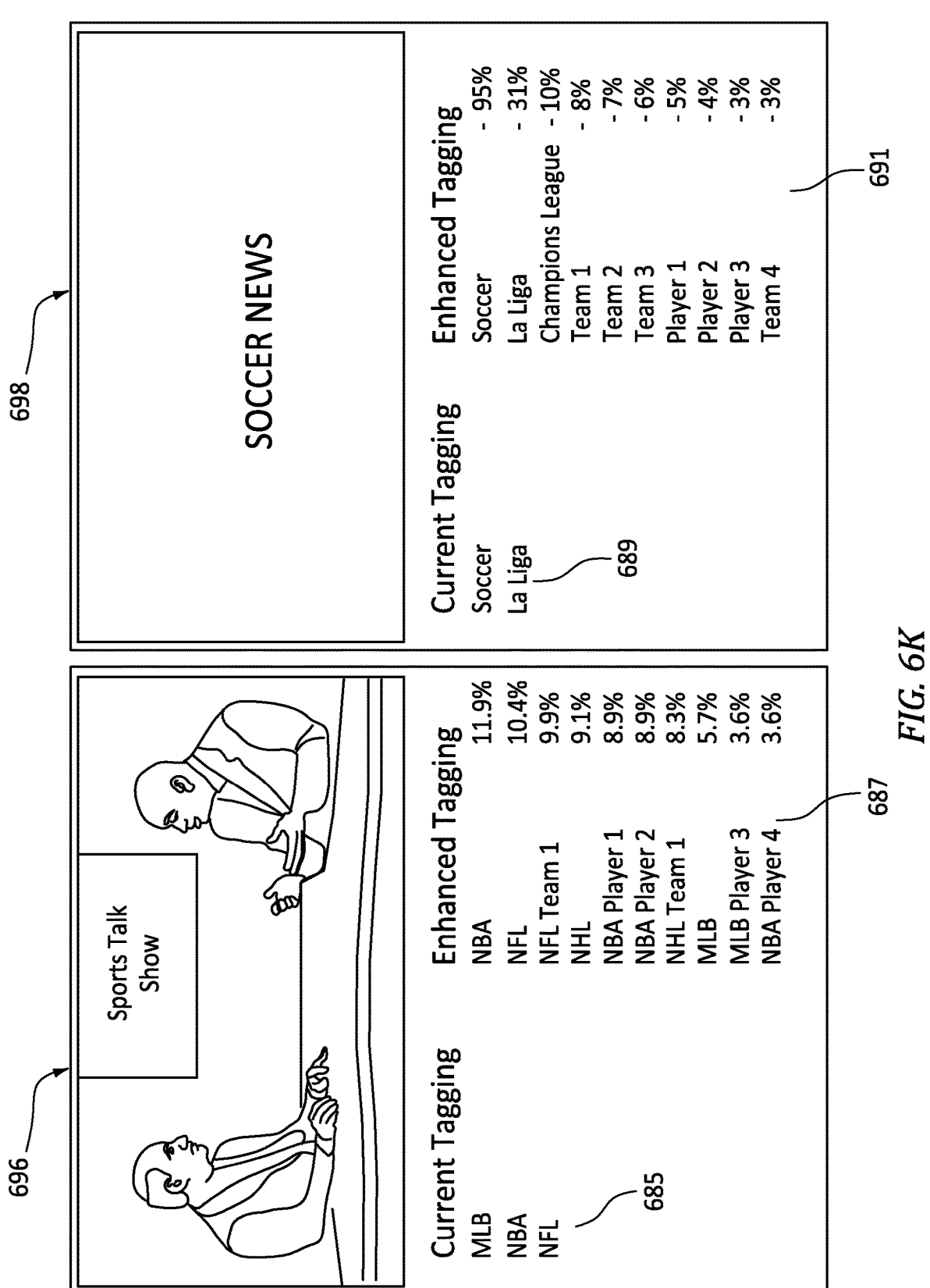
FIG. 6K is a diagram showing two examples of a comparison of conventional tagging and new enhanced tagging (or classification), in accordance with embodiments of the present disclosure.

Referring to FIG. 6J, sample classification results are shown for two shows (Sports Talk and Soccer News) for current (prior art) tagging and for the new enhanced tagging (or classification) of the present disclosure. For the Sports Talk show, the current tagging only provides very high-level tagging as shown by the listing 685, whereas the enhanced tagging of the present disclosure provides a much more comprehensive tagging breakdown as shown by the listing 687. Similarly, for the Soccer News show, the current tagging only provides very high-level tagging as shown by the listing 689, whereas the enhanced tagging of the present disclosure provides a much more comprehensive tagging breakdown as shown by the listing 691.

Referring to FIG. 7A, a flow diagram 700 illustrates one embodiment of a process or logic for providing the Media Clip (MC) Creation Logic 212 (FIG. 2), which takes the Segments having a begin (or start) time and an end (or stop) time and creates media clips from the AV Media input data. The process 700 starts at a block 702, which retrieves the text Segments with timestamps from the Text Segment & Classification Logic or MC Server 18, for a given event. Next, block 704 creates AV Media Clips for the text Segment by clipping the AV Media data using the begin and end timestamps from the current Text Segment (see FIG. 7B and discussed below) and save the media Clip on the MC Server 18. Next, block 706 retrieves the Entities, % total video time, and % rollup from the text Segment data for each Entity in the Segment and saves it in the Media Clip Listing Table (see FIG. 7C and discussed below). Next, block 708 determines if all the text Segments have been converted to media clips. If NO, block 710 goes to the next text Segment and the logic returns to block 702 with the next text Segment. If the result of block 708 is YES, all the Segments have been converted to Media Clips and next block 712 sends an Alert to the MC Aggregation Logic 20 indicating that a set of media clips (MCs) for a given event is available for viewing. In some embodiments, the block 712 may send an Alert directly to the User Device 34 indicating that a set of media clips (MCs) for a given event is available for viewing.

The "clipping" or extracting described herein of the AV Media data to create Media Clips (MCs) may be performed or implemented in a variety of ways, such as: copying a portion of the AV Media data file (audio and video) from the Segment begin timestamp to the Segment end timestamp and saving it on the MC Server, or saving on the MC Server pointers to the Segment begin timestamp and the Segment end timestamp in the AV Media data file, which may be stored on one or more servers, which may include the MC Server. Any other technique for extracting and playing a desired section or portion or segment of video or audio defined by begin and end timestamps from a larger video or audio file, which provides the desired function and performance may be used if desired.

Referring to FIG. 7B, the Text Clusters & Segments Table 675 (FIG. 6C), having the Clusters and Segments and the corresponding start and end times for the Segments, is used to obtain or extract or clip from the AV Media Data shown as a table 750, using the begin and end times for a given text Segment to extract Media Clip (MC) for each text Segment. FIG. 7B shows a sample result of the clipping process, where dashed line arrows 752 show alignment between Text Segments begin and end timestamps to the corresponding timestamps in the input AV Media Data, for clipping the AV Media Data to make the Media Clips (MCs). The AV Timestamp in the AV Media Data may be part of the original media data provided to the system of the present disclosure or it may be added to the media data by the present system or by a separate system or software. Also, the AV Timestamp shown may be the associated with or correspond to a video frame (or AV Frame), which may be used for clipping the video file. In the case where the input AV media data is an audio-only file, the AV Timestamp may be associated with the audio file for audio file clipping purposes. Any other technique may be used to clip the audio or video file at the appropriate place associated with the segment begin and end timestamps provided by the text segmenting process, such as that described regarding Text Segment & Classification Logic 600 of FIG. 6A.

Referring to FIG. 7C, the Media Clips (MCs) may be saved in a table or database, such as that shown in an MC Listing Table 770. In particular, column 772 has an MC Number, for a 30 min event, if the Segments are about 3 min each, there may be about 10 MCs for that event (MC1-MC10). The next column 776 is the Show Name, which is the name of the event being analyzed. The next column 778 is the date the show aired. The next column 780 is the begin and end times for the MC (from the text Segment). The next column 782 is the time length for the MC (from the text Segment). The next column 784 provides the MC Video (or AV) Clip link. The next column 786 provides the MC Topic or Title. The next column 788 provides the Entity list for the MC. The next column 790 provides the Entity % total video time, and the next column 792 provides the Entity % rollup (from the text Segment data). Other columns with other data may be used if desired.

Referring to FIG. 8A, a flow diagram 800 illustrates one embodiment of a process or logic for providing the Media Clip (MC) Aggregation Logic 20 (FIG. 1), which takes (or receives) the Media Clips from a plurality of shows and provides an aggregated collection of media clips based on user attributes or other factors or inputs. The process 800 starts at block 802, which receives an Alert from the Media Clip Creation Logic 212 indicating that a set of Media Clips from a given show are available for viewing (or listening or reading). Next, block 804 retrieves the Media Clips (MCs) with timestamps from the Media Clip Server 18 for a given event. Next, block 806 aggregates the Media Clips from various shows or events into one or more groups (see FIG. 8B, also discussed below) based on User Attributes Data or other data and saves the Aggregated Media Clips on the MC Aggregation Server 26 (FIG. 1). Next, block 808 determines whether there is a Media Clip (MC) available that matches certain user attributes or settings from the User Attributes Data, such as user MC Likes or Alert Settings. If Yes, a block 810 sends an Alert (or MC Alert) to the User Device 34 or the MC App 36 indicating that at least one set of aggregated Media Clips (MCs) from one or more shows or events are available for viewing (or listening or reading) and the logic exits. Other data, attributes or settings may be used for determining when to send alerts if desired. In some embodiments, there may be system default data that determines when to send alerts, e.g., always send alerts when new content is available or send alerts when content is available one time per week or per day or per month or the like. Such periodic alerts may also be settable by the user. If the result of block 808 is No, the logic exits.

The MC Alert message may be sent directly to the User Device 34 (e.g., text message or SMS or the like) or to a personal online account of the user, e.g., email or the like. In other embodiments, the MC alert message may be sent or posted via social media, and may be sent to certain social media groups or news feeds (e.g., sports or team or player related social media groups, or the like). The graphical format and content of the MC alert may be a pre-defined, such as a pop-up box having text or graphics, such as: "Media Clips for a Show/Event are available. Click this Alert box to get details or to view," or it may specify the show/event, such as: "Media Clips for Show A are now available for viewing. Click this Alert box to get details or to view." In some embodiments, if the user clicks on the Alert box, the MC App is launched and the user can explore the media clips in more detail, e.g., with the media clips GUIs discussed herein. Any other format and content for the MC Alerts may be used if desired and may also be set by the user in some embodiments.

Referring to FIG. 8B, in some embodiments, the MC Aggregation Logic 20 combines Media Clips from different MC Listing tables 770 (FIG. 7C) to create an MC Aggregate Listing Table for use by the User. For example, three (3) Media Clips (MC1,MC2,MC3) from Show A that aired on Feb. 16, 2023 may be obtained from the corresponding MC Listing Table for Show A and put into the MC Aggregate Listing Table 858 as Media Clips MC1, MC2,MC3. Similarly, one (1) Media Clip (MC1) from Show B that aired on Feb. 17, 2023 may be obtained from the corresponding MC Listing Table for Show B and put into the MC Aggregate Listing Table 858 as Media Clip MC4. Similarly, one (1) Media Clip (MC1) from Show C that aired on Feb. 18, 2023 may be obtained from the corresponding MC Listing Table for Show C and put into the MC Aggregate Listing Table 858 as Media Clip MC5. The User Attributes Data or other data may be used to determine which Media Clips from which shows to combine into the MC Aggregate Listing Table. Also, there may be a plurality of MC Listing Tables for different time periods or different content or different themes or the like.

Referring to FIG. 8C, a Show/Event Metadata Table 870 is shown, which may be used to obtain show names times, duration, or host names, or to provide host characteristics (such as host talk speed or other host characteristics that might be of interest to users) or other show data, which may be used the system of the present disclosure to provide the desired functions or features or performance described herein. Host talk speed may be provided as fast, medium, slow or provided in number of words per minute, which may be useful for interpreting the text transcription for certain applications.

Referring to FIG. 8D, a User Attributes Table 876 is shown, which provides information about the users of the MC App. The data may include User ID, Sports, Teams, Players, Shows, Age, Gender, MC Likes, MC dislikes, Alert Settings, Aggregation settings, and the like, as shown by columns 878, 880, 882, 884, 886, 888, 890, 892, 894, 896, 898, respectively of the User Attributes Table 876. In particular, in this example, User 1 likes Football and Hockey (column 880), has Team A and Team B as favorite teams (column 882), Player A and Player B as favorite players (column 884), and Show A and Show B as favorite shows (column 886). The MC Likes column 892 list MCs that the user liked and would like to see more of. For Example, in this case, User 1 likes MC1 and MC4 from a given show/event, and would like to see more like them. Conversely, the MC Dislikes column 894 list MCs that the user did not like and would like to see less of or not see again. For Example, in this case, User 1 dislikes MC2 and MC5 from a given show/event, and would like to see less clips (or no more clips) like those. The Alert Settings column 896 lists Entities that the user would like to receive an alert for when MC content having that Entity or Entities becomes available. For example, User 1 would like to receive an alert when Team A is an Entity mentioned in Show A. The Aggregate Settings column 898 lists Entities that the user would like to aggregate into a compilation of MCs, and receive an alert for when MC content having that content becomes available. For example, User 1 wants to aggregate the MC Likes associated with Shows that the user likes. The other rows/users shown in Table 876 operate in a similar fashion. Other settings, preferences or attributes may be used if desired.

Referring to FIG. 9, a flow diagram 900 illustrates one embodiment of a process or logic for providing the Review and Adjustment Logic 22 (FIG. 1), which reviews various data, including feedback data from various types of users (e.g., general public users, editor/publisher/administrator users, or other users) and media clips and adjusts certain data or parameters or logic to improve the quality of the Media Clips (MCs) and improve the overall performance and media clip quality of the system of the present disclosure. The process 900 starts at a block 904, which retrieves general user input feedback on the quality of the MCs, such as MC Likes, MC Dislikes, and any other feedback or comments on quality of the MCs from users. In some embodiments, the logic 900 may also retrieve MCs from the MC Server or MC Aggreg. Server or data from the User Attributes Server or from the MC App (or MC Editor App), as needed to perform the functions herein. In some embodiments, the user feedback may be obtained by retrieving comments entered by the user through the MC App through the user device. In some embodiments, feedback may be obtained by reviewing data posted on social media platforms, such as a user's social media page, and may also determine user sentiment of the post, e.g., positive (like), negative (dislike), or neutral. Any other online source having credible and relevant information about a user's assessment or rating of the Media Clip (MC) may be used if desired. The MC App may also give the user the ability to rate the MC on a rating scale of 1-5, with 5 being the best, and 1 being the worst. Other values and ranges may be used if desired. Other forms of feedback from the user may be used if desired.

Next, block 906 retrieves editor user input feedback for improving transcriptions, segmenting/clipping, Entity recognition, and classification, or other functional components, logics or features of the system of the present disclosure (discussed hereinafter with FIGS. 10A and 10B). In some embodiments, the editor user feedback may be obtained by inputs entered by the editor user through the Editor MC App 1080 through the user device, using a user interface such as that shown in FIG. 10D. In some embodiments, feedback from editor (or publisher or administrator) users, i.e., users responsible for checking the quality of content provided to the general public viewers or users, may be in the form of MC's or videos that have been modified by the Editor or text comments provided by the editor through the MC Editor App. Any other online inputs or feedback from the editor user about an editor user's assessment or feedback or rating of the Media Clip (MC) may be used if desired.

Next, block 908 adjusts the Segment & Clipping Rules/ Data to improve MC quality based on the feedback received using machine learning and AI and using general user and editor user feedback data as training data. For example, for general user feedback using a rating, if most of the low-quality (low rating) MCs have a Segment time length greater than 4 min long, the Max. Segment length may be changed by the system from 5 min to 4 min and then review the user feedback to see if it improves. This adjustment may be done for any or all of the Segment & Clipping Rules/Data parameters, and may be done automatically in realtime, to determine if a given parameter adjustment improves the rating. Such an adjustment may be done for all users or for just a single user or for users having similar user profiles or user attributes to the user(s) giving the low-quality rating. There may also be other fields for the user to select certain aspects of the video to rate or a text field that allows users to provide text comments which would be read by the logic 900 and acted upon accordingly to adjust quality.

Regarding feedback from editor (or publisher or administrator) users, the system may review the modifications made to the MC by the editor and automatically in realtime make similar edits to future MC's using machine learning or AI techniques.

Also, in some embodiments, there may be user attributes (or settings or preferences) that allow the general user or editor user to select which MC's or which shows get the best responses from the users or viewers and which get the worst, and the system can learn to adapt the MC segmenting rules in real time, e.g., adjust entity detection, entity classification, media clip duration or any other parameters, to improve the viewing or listening experience and results for the users. This may be done using known artificial intelligence and/or machine learning techniques, such as support vector machines, neural networks, random forest, logistic regression, and the like.

In particular, in some embodiments, the system may use machine learning to adjust or improve the MC quality automatically in real-time. Also, in some embodiments, the system may display a collection of potential MCs associated with a given show and the general user or editor user can select the desired MC to use for that show. For example, the system may provide two versions of MCs for a given show, one set that includes an additional sentence or two (i.e., increase MC duration) that may improve quality for certain MCs and another set that does not include that content.

Also, the data received by the system from the general user or editor user may be used by the system alone or combined with other third-party data or used with the assistance of a predictive model. The predictive model(s) of the present invention may include one or more neural networks, Bayesian networks (such as Hidden Markov models), expert systems, decision trees, collections of decision trees, support vector machines, or other systems known in the art for addressing problems with large numbers of variables. In some embodiments, the predictive models are trained on prior data and outcomes using a historical database of related MCs and shows, and the corresponding feedback provided by editor users and general users described herein, and a resulting correlation relating to the same, different, or a combination of same and different MCs. For example, if the editor user determines that a given MC is talking about Tom Brady the golfer, but the system identified the entity as Tom Brady the football player, the change in entity status or the rules associated with that entity determination may be used by the predictive model as training data for future Entity determinations. In another example, if the system classifies a show or MC as being 30% about Tom Brady, and the editor user or general user determines that it is really 80% about Tom Brady, as shown by the editor comments or other inputs, the system may use this correction as training data for future MC and show classifications.

Figure 10A:
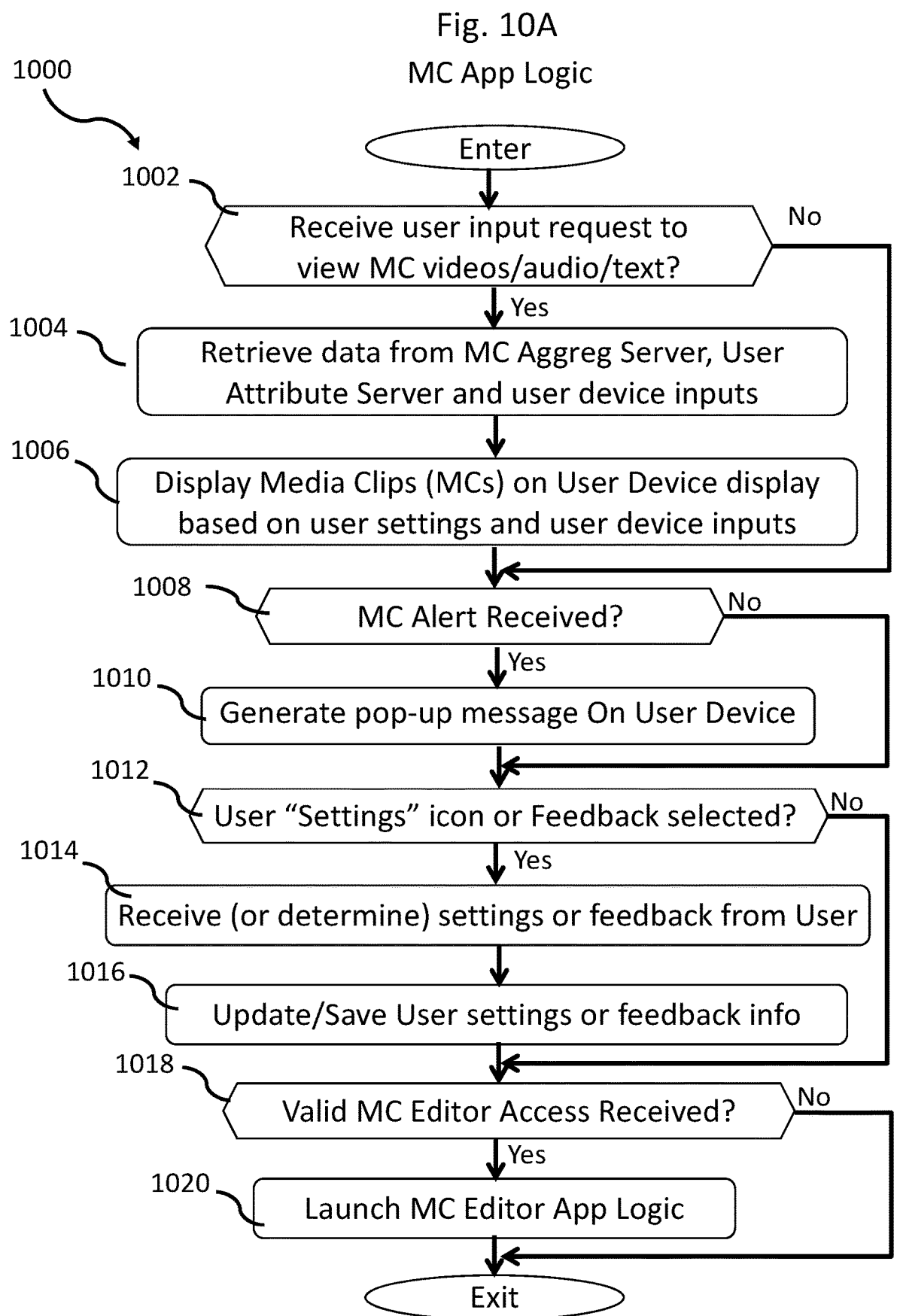
FIG. 10A is a flow diagram of Media Clip App (MC App) software application, in accordance with embodiments of the present disclosure.

Referring to FIG. 10A, a flow diagram 1000 illustrates one embodiment of a process or logic for providing, the MC App Logic 136 (FIG. 1). The process 1000 runs when the AE App 36 is launched and begins at a block 1002, which determines whether the device has received a user input request to display MC videos, or audio or text. If Yes, the user has requested to view available Media Clips and block 1004 retrieves data from the MC Aggregation Server 26, the MC Server 18, and the User Attributes Server 24, as well as input data from the user via the user device user input (e.g., touch screen display, mouse or other user input interface). Next, a block 1006 uses the data retrieved in the block 1004 to display available Media Clips (see FIG. 10B) on the display 38 of the User Device 34 based on user settings, e.g., User Attributes Data in the User Attributes Table or other data, and user device inputs.

Next, or if the result of block 1002 was NO, a block 1008 determines whether an MC Alert has been received. If YES, a block 1010 generates a pop-up Alert message on the user device 34 display indicating an MC is available and the user can then go to the MC GUI screen 1050 (FIG. 10B) to view the MC. Next, or if the result of block 1008 is NO, block 1012 checks if either the "Settings" icon 1066 (FIG. 10B) or the User Feedback button 1068 has been selected. If YES, block 1014 receives input settings or user feedback data from the user, e.g., for display format, user attributes, alert settings, or user feedback. Next, block 1016 saves (or updates) the settings or feedback data, based on the selections made by the user or text typed by the user. Next, block 1018 determines if a valid MC Editor access has been received by an authorized MC editor by selecting the MC Editor access button 1069 (FIG. 10B) and entering any necessary user authentication (e.g., username and password). If Yes, block 1020 launches the MC Editor App (FIGS. 10C and 10D), which allows an Editor user to adjust an MC and provide feedback to the system, and the logic exits.

Some of the MC App settings data may be stored in the User Attributes Listing table 876 (FIG. 8D) on the User Attributes Server 24 (FIG. 1), such as user information or the Alert Settings, and some settings data may be stored locally on the User Device 34. Any other data storage arrangement and locations that performs the functions of the present disclosure may be used if desired.

Figure 10B:
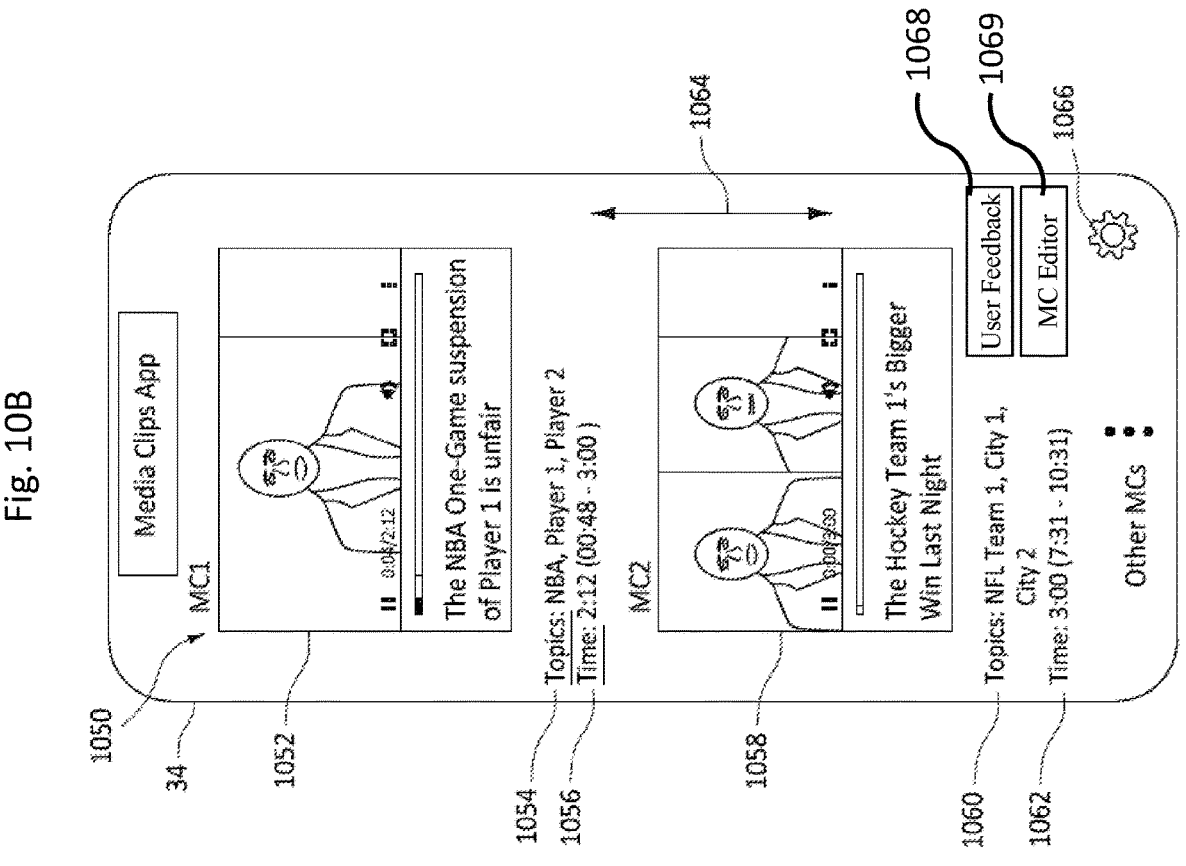
FIG. 10B is a screen illustration of a graphic user interface (GUI) for the Media Clip App (MC App) software application, in accordance with embodiments of the present disclosure.

Referring to FIG. 10B, a screen illustration 1050 of the graphic user interface (GUI) for the MC App 36 (FIG. 1) on the display 38 of the user device 34 is shown, including a listing of a plurality of Media Clips that may be scrolled through by the user on the display 38 of the user device 34. For example, a top media clip 1052 is shown with a Title of "The NBAs One-Game Suspension of Player 1 Is Unfair", having a length of 2:12, which can be played and paused/ stopped by the user as desired. The MC App also displays the Topics or Entities 1054 mentioned (NBA, Player 1, Player 2) in the MC as well as the MC time length 1056 (2:12). A second media clip 1058 is shown with a Title of "The Hockey Team #1's Bigger Win Last Night", having a length of 3:00, which can be played and paused/stopped by the user as desired. The MC App also displays the Topics or Entities 1060 mentioned (NFL Team 1, City 1, City 2) in the MC as well as the MC time length 1062 (3:00). Also, any given video can be played or paused by the user. Also, the GUI (or UI) allows for scrolling up or down through the MC listing as shown by the bidirectional arrow 1064. Also, a gear icon or image 1066 is displayed which allows the user, when selected, to update the user settings for the MC App. The User Feedback button 1068, when selected, allows the user to provide user feedback using text typed by the user. The MC Editor button 1069, when selected, allows an editor user to launch the MC Editor App Logic, discussed hereinafter with FIGS. 10C, 10D.

Referring to FIG. 10C, a flow diagram 1070 illustrates one embodiment of a process or logic for providing MC Editor App Logic, which may be called or invoked from the main MC App (see MC App Logic, FIG. 10A). The process 1070 runs when called by the AE App 36 and begins at a block 1072, which displays Media Clips (MCs) on one side of User Device display and a window on the other side with the selected MC or the full show video and a window with the corresponding transcript text (see FIG. 10D). Next block 1074 determines of a section of an MC has been selected by the user editor via user input (e.g., touch screen display, mouse or other user input interface). If No, the logic exits.

If the result of block 1074 is Yes, the user has edited a Media Clip and block 1076 receives the user editor input for improving transcriptions, segmenting/clipping, entity recognition, or classification. In particular, if the editor user selects MC1 thumbnail on the left side of screen, the video window 1086 will show the MC1 video with additional (and adjustable) amount of time (X seconds), e.g., 20 seconds, added to beginning and end of video (MC+X seconds). The window 1086 allows the editor user to select a desired begin and end time using the arrows or pointers 1089,1088, respectively. The same may be done with the text window 1087, using the arrows 1093,1094, to identify a sentence or word or phrase that the user wants to add or remove from the Media Clip and use the control or command buttons 1094, and the area buttons 1095.

Next, block 1078 saves the MC improvements on MC Server (as updated media clip) and on Segment Data Server (as training data) so the system can learn through machine learning or artificial intelligence how to improve the quality of the clips, which is discussed more herein above with the Review and Adjustment Logic of FIG. 9.

Figure 10D:
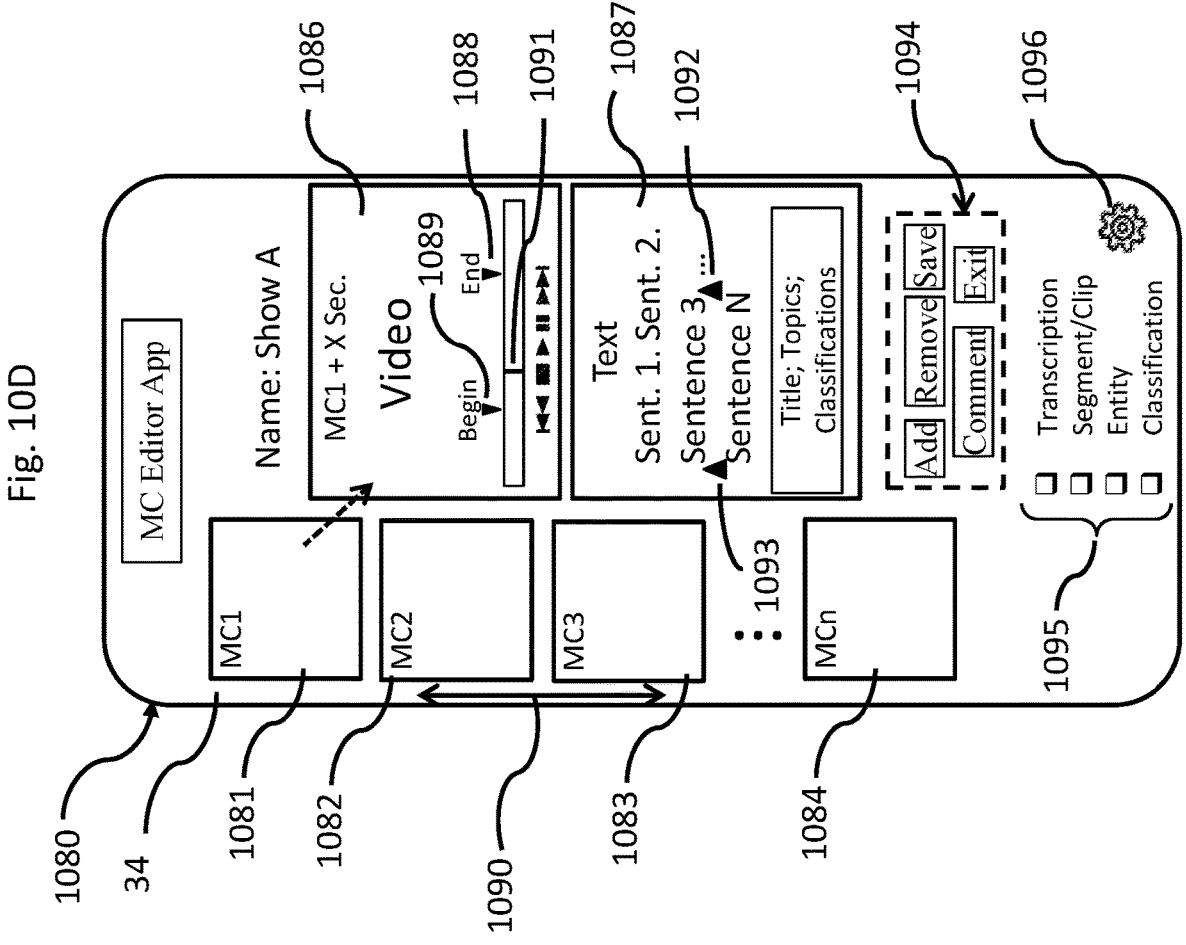
FIG. 10D is a screen illustration of a graphic user interface (GUI) for the MC Editor App software application, in accordance with embodiments of the present disclosure.

Referring to FIG. 10D, a screen illustration 1080 of the graphic user interface (GUI) for the MC Editor App, on the display 38 of the user device 34 is shown, including a listing of a plurality of Media Clips (MCs) 1081-1084 (MC1-MCn) on the left side of the screen that may be scrolled through by the user on the display 38 of the user device 34. The MC App also displays a larger window 1086 on the right side of the display 38 for playing or reviewing the selected MC or the entire show, which can be played, paused/stopped, rewound, or fast forwarded, by the user as desired. The window 1086 also shows a play line 1091 which can be dragged left (backwards in time) or right (forward in time) to select where in the video to play or view. The MC Editor App also displays a window 1087 which shows the text of the transcript which may be synchronized or track with or corresponds to the video playing in the window 1086, for reviewing the text in realtime. The MC Editor App also displays a window 1094, which has several control buttons, such as Add, Remove, Save, Comment and Exit. Other controls may be used if desired. When the Comment button is selected, the display provides a field to insert or type a comment about the MCs. The MC Editor App also displays a section 1095, which has selectable check boxes or radio buttons, e.g., transcription, segment/clip, entity, classification, indicating which feature or logic or rules area the user editor may be editing. Other controls may be used if desired. Also, the GUI (or UI) allows for scrolling up or down through the thumbnail MC video listing as shown by the bidirectional arrow 1090. Also, a gear icon or image 1096 is displayed which allows the user, when selected, to update the user setting for the MC Editor App, which may be the same or different from the settings on the main app.

While the disclosure has been discussed as providing media clips (MCs) in the form of video or audio clips, the present disclosure may also be used when receiving only text, e.g., an article or a text transcript or the like. In that case, the MC comprises text segments or the entire text article, which are classified by entity. In particular, in that case, the text sources 8 (FIGS. 1 and 2) are provided directly to the Segmenting & Clipping Logic 12, and are processed directly by the Entity ID and Correction Logic 204 (FIG. 2), without the need for the Transcription Logic 202. Then, the clean entity-tagged text is segmented and classified by the Text Segment and Classification Logic 210 and saved on the Media Clip (MC) Server 18, similar to the video/audio files are saved. When the user launches the MC app and pulls up the article, the MC App may display the text segments in separate boxes on the left side of the screen for the MC's and the right side would populate the text display box for viewing by the general users or editor users. The display may also provide text segments having titles and classifications for viewing or reading by a user, similar to how it has been described herein for an audio or video input file; however, in that case, the output media clip is simply classified and titled text or text segments. In the case of text input, the entities may be classified by any desired amount or units indicative of usage, e.g., percentage of time or word count, or any other desired units.

Figure 11:
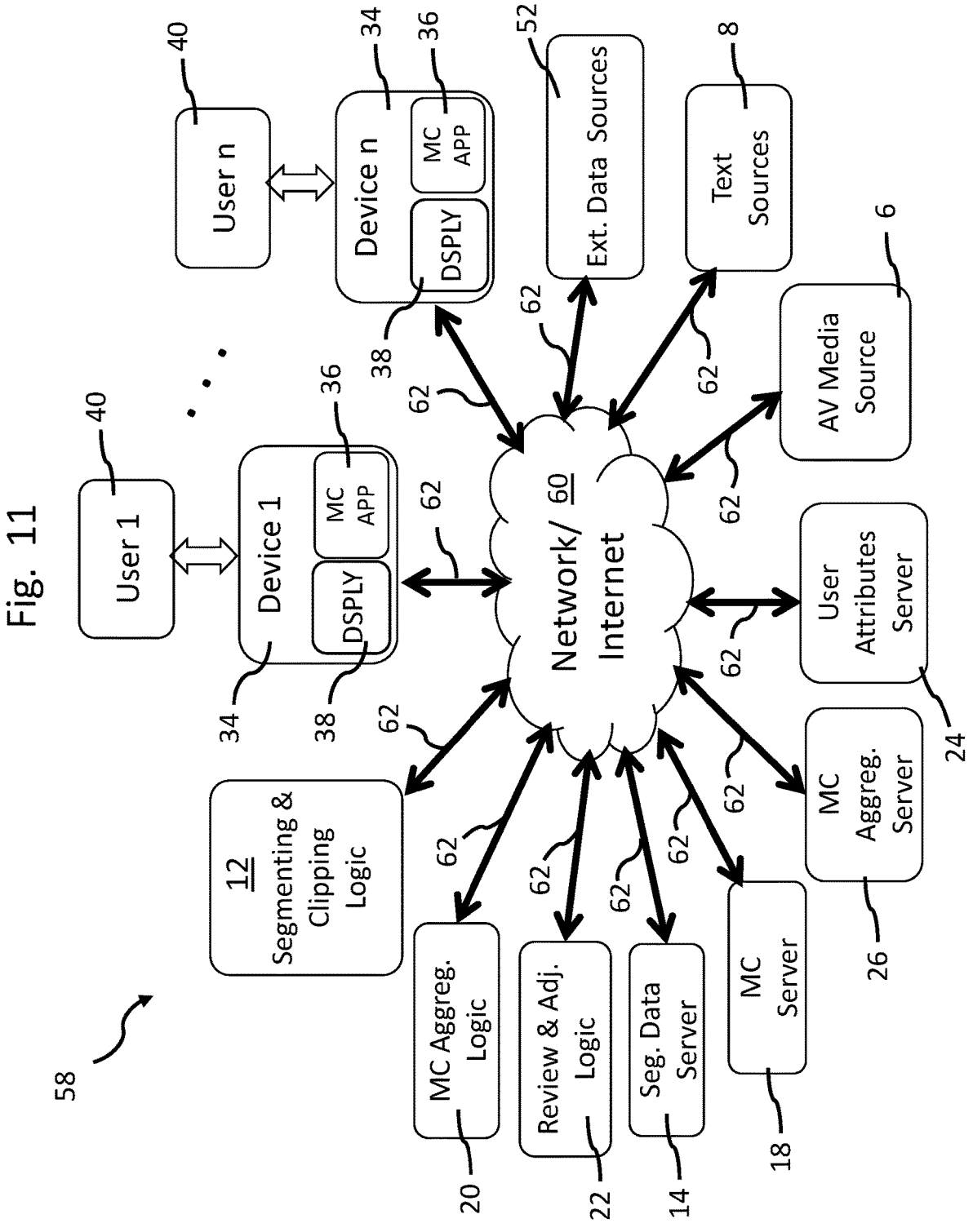
FIG. 11 is a block diagram of various components of the system of FIG. 1, connected via a network, in accordance with embodiments of the present disclosure.

Referring to FIG. 11, the present disclosure may be implemented in a network environment 58. In particular, various components of an embodiment of the system of the present disclosure include a plurality of computer-based user devices 34 (e.g., Device 1 to Device N), which may interact with respective users (User 1 to User N). A given user may be associated with one or more of the devices 34. In some embodiments, the MC App 36 may reside on the user device 34 or on a remote server and communicate with the user device(s) 34 via the network. In particular, one or more of the user devices 34, may be connected to or communicate with each other through a communications network 60, such as a local area network (LAN), wide area network (WAN), virtual private network (VPN), peer-to-peer network, or the internet, wired or wireless, as indicated by lines 62, by sending and receiving digital data over the communications network 60. If the user devices 34 are connected via a local or private or secured network, the devices 34 may have a separate network connection to the internet for use by web browsers running on the devices 34. The devices 34 may also each have a web browser to connect to or communicate with the internet to obtain desired content in a standard client-server based configuration to obtain the MC App 36 or other needed files to execute the logic of the present disclosure. The devices may also have local digital storage located in the device itself (or connected directly thereto, such as an external USB connected hard drive, thumb drive or the like) for storing data, images, audio/video, documents, and the like, which may be accessed by the MC App 36 running on the user devices 34.

Also, the computer-based user devices 34 may also communicate with separate computer servers via the network 60 for the MC Server 18, Segment Data Server 14, the MC Aggreg. Server 26, and the User Attributes Server 24. The servers 14, 18,24,26 may be any type of computer server with the necessary software or hardware (including storage capability) for performing the functions described herein. Also, the servers 14, 18,24,26 (or the functions performed thereby) may be located, individually or collectively, in a separate server on the network 60, or may be located, in whole or in part, within one (or more) of the User Devices 34 on the network 60. In addition, the AV Media Sources 6 and the Text Sources 8 and the External Data Sources 52, may each communicate via the network 60 with the Segmenting & Clipping Logic 12, the MC Aggregation Logic 20, and the Review and Adjustment Logic 22, and with each other or any other network-enabled devices or logics as needed, to provide the functions described herein. Similarly, the User Devices 34 may each also communicate via the network 60 with the Servers 24,26,28 and the Logics 12,20,22, and any other network-enabled devices or logics necessary to perform the functions described herein.

Portions of the present disclosure shown herein as being implemented outside the user device 34, may be implemented within the user device 34 by adding software or logic to the user devices, such as adding logic to the MC App software 36 or installing a new/additional application software, firmware or hardware to perform some of the functions described herein, such as some or all of the Segmenting & Clipping Logic 12, the MC Aggregation Logic 20, or the Review and Adjustment Logic 22, or other functions, logics, or processes described herein. Similarly, some or all of the Segmenting & Clipping Logic 12, the MC Aggregation Logic 20, or the Review and Adjustment Logic 22 of the present disclosure may be implemented by software in one or more of the MC Server 18, Segment Data Server 14, the MC Aggreg. Server 26, and the User Attributes Server 24, to perform the functions described herein, or some or all of the functions performed by the MC App software 36 in the user device 34.

The system, computers, servers, devices and the like described herein have the necessary electronics, computer processing power, interfaces, memory, hardware, software, firmware, logic/state machines, databases, microprocessors, communication links, displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: tablets, laptop computers, desktop computers, smartphones, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. An automated computer-based method for providing at least one media clip (MC) from an event for display or listening on a user device, comprising:

receiving media data indicative of the event;

transcribing the audio portion of the media data into text with timestamps;

identifying entities within the text, the entities being named in the content of the text;

performing phonetic correction and co-reference resolution of the entities using predetermined phonetic rules and predetermined co-reference rules, respectively;

segmenting the text into a plurality of text segments based on predetermined text segment creation rules, each of the text segments having at least one of the entities and having a segment begin timestamp and a segment end timestamp;

clipping from the media data the at least one media clip having a clip begin timestamp and clip end timestamp that corresponds to the segment begin timestamp and the segment end timestamp of a corresponding one of the text segments; and providing the at least one media clip for viewing or listening on the user device, wherein the identifying, performing, segmenting, and clipping are performed contiguously in an automated manner without human intervention after receiving the media data using the predetermined phonetic rules, the predetermined co-reference rules, and the predetermined text segment creation rules.

2. The method of claim 1, further comprising determining an entity classification of the at least one entity comprising an amount of time that the at least one entity is mentioned during a given segment or during the entire event, and wherein the media clip includes the entity classification.

3. The method of claim 1, wherein the segmenting further comprises creating text clusters from the text based on cluster creation rules, each cluster having at least one entity and having a cluster begin time and a cluster end time.

4. The method of claim 3, wherein the cluster creation rules comprises at least one of: maximum entity gap length, minimum mention count, minimum cluster length, and cluster adjustment time, and cluster exclusion rules.

5. The method of claim 3, further comprising receiving feedback from a user or an editor on the quality of the at least one media clip and adjusting the cluster creation rules or segment creation rules to improve the quality of media clip.

6. The method of claim 5, where in the adjusting is performed using a machine learning model which is trained using prior adjustments.

7. The method of claim 1, wherein the segment creation rules comprises at least one of maximum segment length and segment exclusion rules.

8. The method of claim 1, wherein the phonetic rules comprises a minimum possible phonetic partial match.

9. The method of claim 1, wherein the co-reference rules comprises a co-reference offset maximum.

10. The method of claim 1, further comprising aggregating a plurality of the at least one media clip from a plurality of different shows or events.

11. The method of claim 10, wherein the plurality of different shows or events corresponds to shows or events selected by the user.

12. The method of claim 1, wherein the co-reference resolution comprises associating the entities in the text with corresponding pronouns, relationship words, nicknames, and abbreviations.

13. The method of claim 1, wherein the user device comprises a graphic user interface (GUI), which when selected, causes the media clip to play on a device display.

14. The method of claim 1, further comprising sending an MC alert message to the user device when a MC is available for viewing or predetermined MC alert criteria are satisfied.

15. The method of claim 14, wherein the predetermined MC alert criteria comprise at least one of: MC matching user attributes, MC matching user MC likes, MC matching user Alert settings.

16. The method of claim 1, further comprising receiving a settings command from a user and receiving settings inputs from a user.

17. The method of claim 1, further comprising receiving user attributes data from a user.

18. The method of claim 1, further comprising determining a title for the text segment and providing the title with the media clip for display by the user device.

19. The method of claim 1, wherein the media clip is less than 5 min long.

20. The method of claim 1, wherein the event comprises a sports show or sporting event.

21. The method of claim 1, wherein the media data comprises an audio-only data file.

22. An automated computer-based method for providing at least one media clip (MC) from an event for display on a user device, comprising:
  receiving media data indicative of the event, the media data having video timestamps;
  transcribing the audio portion of the media data into timestamped text;
  identifying one or more entities within the text, the entities being named in the content of the text;
  performing phonetic correction and co-reference resolution of the entities;
  segmenting the text into a plurality of text segments, each of the text segments having at least one of the entities and having a segment begin timestamp and a segment end timestamp;
  determining an entity classification of the at least one entity comprising an amount of time the at least one entity is mentioned during a given segment or during the entire event;
  clipping from the media data the at least one media clip having a media clip begin timestamp and media clip end timestamp that corresponds to the segment begin timestamp and the segment end timestamp of a corresponding one of the text segments; and
  providing the at least one media clip with the entity classification to the user device, the user device being configured to show the at least one media clip,
  wherein the identifying, performing, segmenting, determining, and clipping are performed contiguously in an automated manner without human intervention after receiving the media data, using predetermined rules.

23. The method of claim 22 wherein the phonetic correction, co-reference resolution, and the segmenting are performed using the predetermined rules.

24. An automated computer-based method for providing at least one media clip (MC) from a sports event for display on a user device, comprising:
  receiving media data indicative of the event, the media data having an audio channel and a video channel, the video channel having video timestamps;
  transcribing the audio channel portion of the media data into text with timestamps;
  identifying entities being named in the content of the text and associating the entities in the content of the text with corresponding pronouns, relationship words, nicknames, and abbreviations;
  creating a plurality of text segments from the text, each of the text segments having the at least one of the entities and having a segment begin timestamp and a segment end timestamp;
  extracting from the media data the at least one media clip having a media clip begin timestamp and a media clip end timestamp that corresponds to the segment begin timestamp and segment end timestamp of a corresponding one of the text segments; and
  providing the at least one media clip to the user device for viewing by a user,
  wherein the identifying, creating, and extracting are performed contiguously in an automated manner without human intervention after receiving the media data, using predetermined rules.

25. An automated computer-based method for providing at least one media clip (MC) from an event for display or listening on a user device comprising:
  receiving media data indicative of the event;
  transcribing the media data into timestamped text;

identifying entities within the text, the entities being named in the content of the text;

creating text segments having at least one of the entities and having a segment begin timestamp and a segment end timestamp and having a minimum number of entity mentions in the text segments within a maximum entity gap length time;

clipping from the media data the at least one media clip having a clip begin timestamp and a clip end timestamp corresponding to the segment begin timestamp and the segment end timestamp of a corresponding one of the text segments; and providing the at least one media clip to the user device for viewing or listening by a user, wherein the identifying, creating, and clipping are performed contiguously in an automated manner without human intervention after receiving the media data, using predetermined rules.

26. The method of claim 25, further comprising determining an entity classification of the at least one entity comprising an amount of time that the at least one entity is mentioned during a given segment or during the entire event, and wherein the media clip includes the entity classification.

27. The method of claim 25, wherein the creating text segments further comprises creating text clusters from the text based on cluster creation rules, each cluster having at least one entity and having a cluster begin time and a cluster end time.

28. The method of claim 27, wherein the cluster creation rules comprises at least one of: maximum entity gap length, minimum mention count, minimum cluster length, and cluster adjustment time, and cluster exclusion rules.

29. The method of claim 28, further comprising receiving feedback from a user or an editor on the quality of the at least one media clip and adjusting the cluster creation rules or segment creation rules to improve the quality of media clips.

30. The method of claim 29, where in the adjusting is performed using a machine learning model which is trained using prior adjustments.

31. The method of claim 27, wherein the segment creation rules comprises at least one of maximum segment length and segment exclusion rules.

32. The method of claim 25, further comprising performing phonetic correction and co-reference resolution of the entities using predetermined phonetic rules and predetermined co-reference rules, respectively; wherein the phonetic rules comprises a minimum possible phonetic partial match.

33. The method of claim 32, wherein the co-reference rules comprises a co-reference offset maximum.

34. The method of claim 25, wherein the event comprises a sports show or sporting event.

35. An automated computer-based method for identifying and classifying entities in text and providing entity classification tagged text, comprising:

receiving text data, which is a transcription with timestamps of an audio portion of media data;

identifying at least one entity within the text data, the at least one entity being named in the content of the text;

performing phonetic correction and co-reference resolution of the entities using predetermined phonetic rules and predetermined co-reference rules, respectively;

segmenting the text into a plurality of text segments based on predetermined text segment creation rules, each of the text segments having at least one of the entities and having a segment;

determining an entity classification of the at least one entity comprising an amount that the at least one entity is mentioned during a given segment or during the entire event, and wherein the text segment includes the entity classification; and providing the text segments with timestamps and with entity classification to a user device for viewing on the user device, wherein the identifying, performing, segmenting, and determining are performed contiguously in an automated manner without human intervention after receiving the text data, using the predetermined rules.

\* \* \* \* \*